United States Patent [19]

Kumakhov

[11] Patent Number: 5,744,813
[45] Date of Patent: Apr. 28, 1998

[54] METHOD AND DEVICE FOR CONTROLLING BEAMS OF NEUTRAL AND CHARGED PARTICLES

[76] Inventor: Muradin Abubekirovich Kumakhov, 5/2, 34 nab.Novikova-Priboya, Moscow, Russian Federation, 123103

[21] Appl. No.: 602,844
[22] PCT Filed: Jul. 8, 1994
[86] PCT No.: PCT/RU94/00146
  § 371 Date: Feb. 26, 1996
  § 102(e) Date: Feb. 26, 1996
[87] PCT Pub. No.: WO96/02058
  PCT Pub. Date: Jan. 25, 1996
[51] Int. Cl.⁶ .................................................. G02B 5/124
[52] U.S. Cl. .................................. 250/505.1; 378/149
[58] Field of Search .................. 250/505.1; 378/149

[56] References Cited

U.S. PATENT DOCUMENTS

| | | | |
|---|---|---|---|
| 4,317,036 | 2/1982 | Wang | 250/274 |
| 4,395,775 | 7/1983 | Roberts et al. | 250/505.1 |
| 4,582,999 | 4/1986 | Dancer et al. | 250/505.1 |
| 5,016,265 | 5/1991 | Hoover | 378/43 |
| 5,016,267 | 5/1991 | Wilkins | 378/149 |
| 5,071,207 | 12/1991 | Ceglio et al. | 250/505.1 |
| 5,174,755 | 12/1992 | Kumakhov | 378/34 |
| 5,192,869 | 3/1993 | Kumakhov | 250/505.1 |
| 5,497,008 | 3/1996 | Kumakhov | 250/505.1 |
| 5,500,312 | 3/1996 | Harriott et al. | 430/5 |

FOREIGN PATENT DOCUMENTS

| | | |
|---|---|---|
| 0138440 | 4/1985 | European Pat. Off. |
| WO 92/08235 | 5/1992 | WIPO |
| WO 92/09088 | 5/1992 | WIPO |

OTHER PUBLICATIONS

Arkadiev et al., Wideband X-ray Optics with Large Angular Apertures, Advances in Physical Sciences, 1989, vol. 157, Issue 3, pp. 529–537.
Charles Kittel, Introduction to Solid State Physics, New York:Wiley, 1956.

*Primary Examiner*—Bruce Anderson
*Attorney, Agent, or Firm*—McDermott, Will & Emery

[57] ABSTRACT

The present invention provides for bending the beams, their focusing, transforming a divergent radiation into a quasi-parallel one, and vice versa, its filtering and monochromatization. Also attained are reduced radiation transfer losses, extended range of energies used, and higher radiation concentration. A possibility is provided for the use of larger radiation sources without decreasing the proportion of the captured particles, as well as for controlling the radiation spectrum. With this purpose in view, provision is made in the proposed method, apart from multiple reflection of particles upon interaction with different-density alternating media, for diffuse and potential scattering or interference of particles that diffract on multilayer structures applied to reflecting surfaces. In a device carrying the proposed method into effect, the aforementioned surfaces are coated with layers differing in electromagnetic properties. The optical system of the device appears principally as a set of miniature lenses or bemilenses 28, built up of a plurality of capillaries or polycapillaries, the walls of whose channels 24 are provided with an appropriate coating 22. No use of any support structures for forming the profiles of the optical system is required.

65 Claims, 13 Drawing Sheets

METHOD AND DEVICE FOR CONTROLLING BEAMS OF NEUTRAL AND CHARGED PARTICLES

TECHNICAL FIELD

The present inventions relate in general to nuclear physics, more specifically to means for controlling beams of neutral and charged particles, and are aimed at bending such beams, their focusing, transforming a divergent radiation into a quasi-parallel one, and vice versa, its filtering and monochromatization.

BACKGROUND ART

Known in the art are a variety of methods and devices for controlling beams of neutral and charged particles, based use of interference and diffraction phenomena, e.g., Fresnel zone plates, Bragg crystals, multilayer mirrors (cf."Introduction to solid-state physics" by C. Kittel, Moscow, Gosudarstvennoe izdatelstvo fiziko-matematicheskoi literatury, 1963, p.73 (Russian translation).

However, use of such methods and devices fails to attain high radiation concentration and a large angle of beam bend.

These restrictions are eliminated in methods and devices that make use of multiple reflection.

In particular, there is known a method for controlling radiation beams using multiple reflection, realized in a system of curved hollow capillaries (cf. the paper "Wide-band X-ray optics with large angular aperture" by V. A. Arkadyev, A. I. Kolomiitsev, M. A. Kumakhov et al., "Advances in physical sciences", 1989, v.157, issue 3, pp.529–537 (in Russian).

A disadvantage inherent in said method and device resides in a considerable radiation attenuation due to inaccuracies in arrangement of the channels-capillaries during manufacture of the device, as well as a relatively narrow spectral band due to use of capillaries whose diameter exceeds an optimum size of channels. Trying to reduce said diameter in the construction under discussion faces considerable engineering difficulties.

In another heretofore-known device as per U.S. Pat. No. 5,192,869 published Mar. 9, 1993 and a method said device carries into effect, which are most similar to the herein-proposed inventions and wherein use is also made of the multiple reflection concept, the aforementioned disadvantages are partially overcome due to use of rigid support elements spaced definite distances apart from one another lengthwise the device and ensuring rigid fixing of the channel-forming elements at the places where they pass through the holes in the support elements. Appropriately selected arrangement of said holes provides correspondence of the axial lines of individual channels to the generating surfaces of a required shape. Used as channel-forming elements are glass capillaries or polycapillaries.

Such an optical system for controlling radiation beams resembles a barrel or a half-barrel in shape and is therefore given the name of a lens or a hemilens, respectively. Customs made up of capillaries are known as first-generation lenses (hemilenses), whereas those built up of polycapillaries, are known as second-generation lenses (hemilenses).

With the diameter of capillaries and polycapillaries on the order of 300 microns they lose their properties necessary for proper assembling, that is, they start "soaring" in the air as being hollow and cannot be given a required radius of curvature while being assembled, and the capillaries are liable to sag between the points of support. This restriction as to the diameter of capillaries and polycapillaries makes impossible radiation focusing into a spot having a diameter smaller than that of a capillary or the outside diameter of polycapillary. The smallest focal spot diameter attainable with the first- and second-generation lenses is 0.5 mm so that high radiation concentration is unattainable due to too a large focal spot diameter.

Finite size of channels imposes limitation on the range of energies used. With a preset focal length f, even though the radiation is a point-like one, a minimum angle of radiation incidence on the capillary peripheral zone is $\theta=d/2f$, where d denotes the channel diameter.

It is desirable, for an efficient radiation transfer, that the parameter $\theta$ be close to or even less than the critical angle $\theta_c$ of reflection because with an increase in energy the critical angle decreases. This condition restricts use of high energies in lenses of the first and second generations.

For instance, for X-ray energy $E=10$ keV radiation capture into the capillary is not in excess of 15%, and with an increase in the focal length the capture angle decreases and hence the efficiency of the system decreases, too.

It follows from all stated before that it is necessary to change over to the radiation transfer channels having cross-sectional dimensions down to microns and submicrons which is impossible, due to the aforementioned causes, in the construction discussed above and involving use of mechanical assembling in the course of its manufacture. Mechanical assembling is causative of one more disadvantage, that is, angular divergence is determined, in case of the aforementioned assembling, by the expression $\Delta\theta=\Delta L/L$, where $\Delta L$ denotes the sum of variations in the diameter of the capillary and in that of the hole in the support disk (used in the mechanical assembling procedure), L indicates the distance between the support structures, e.g., disks which is not to exceed 1–3 cm. Variation of the capillary diameter is as a rule on the order of 10%, that is, e.g., 40 microns with d=400 microns; variation of the hole diameter is on the order of 10–20 microns with a mean hole diameter of 400 microns. In this case the value of $\Delta\Theta$ is of the order of $5\cdot 10^{-3}$ radians.

Best variants of the secondary-generation hemilenses feature a divergence on the order of $(5-6)\cdot 10^{-3}$ radians.

The aforesaid divergence attainable with mechanical assembling is inacceptable for solving a number of tasks characteristic of the means of the herein-considered applications.

The fact that the method and device disclosed in U.S. Pat. No. 5,192,869 make use of only one physical phenomenon, viz., reflection of radiation from the interfaces of alternating different-density media with which the radiation particles are multiply interact (in combination with the concurrent absorption of the particles), lays obstacles in overcoming the restrictions inherent therein within the framework of the construction discussed herein.

DISCLOSURE OF THE INVENTIONS

The present inventions have for their principal object to provide a higher efficiency in controlling beams of neutral or charged particles. A technical result provided by the inventions resides in a reduced loss of energy of radiation during its transfer, an extended range, towards higher values, of used energies of particles, a higher radiation concentration, as well as in provision of a possibility for controlling the spectrum of the transferred radiation and utilizing larger-size radiation sources without reducing the proportion of the captured particles.

According to the herein-proposed method, like in the known method disclosed in U.S. Pat. No. 5,192,869, there occur a multiply-repeated interaction between the radiation particles and different-density alternating media and their reflection from the interfaces between said media in the course of said interaction.

To attain the aforementioned technical results, in the proposed method, unlike the aforesaid known method, there is performed additionally diffuse and potential scattering or interference of particles that diffract on multilayer structures applied to the reflecting surfaces, while the adjacent different-density alternating media after interaction with which said diffuse or potential scattering and reflection occur, differ in electromagnetic properties. In addition, said alternating media may have their surfaces being both in the same and in the different phase states with respect to their substrate. Said media may be both homogeneous and structurized in a transverse section with respect to the direction of radiation transfer, and the structural elements of said media differing in physical properties are arranged in said section either unorderly or in an ordered manner with the presence of axial symmetry.

It is due to said diffuse scattering that a particle can be captured inside the critical angle of reflection, though initially it could be outside said angle.

Potential scattering can be established by, e.g., coating the substrate with a magnetic layer. In this case neutrons repel from such a magnetic mirror more efficiently.

When the substrate is coated with a multilayer structure, there arises a combination of reflective and interference optics which enables one not only to bend and focus particle beams but also to control their spectrum.

When the substrate is coated with a superconductive layer a possibility arises of more efficient repulsion of charged particles due to Meissner effect.

Alternating media may be in the same phase, e.g., be amorphous but may also be in different phases, for instance, a crystalline layer may alternate with an amorphous one, and a dielectric layer, with a metallic or a superconductive one. In any case this feature opens new possibilities in controlling particle path and spectrum.

The presence of a fine structure in each medium in the form of, e.g., a plurality of small radiation transfer channels in each medium allows of further advancement into the sphere of higher energies.

As a rule, radiation transfer channels are arranged unorderly in a transverse section square with the central axis of the beam propagation. This makes possible radiation focusing in one plane within a rather wide energy range virtually independently of particle energies.

In the case of an ordered arrangement of transfer channels where the channels feature strict symmetry, there occurs quite a novel effect, that is, interference at the exit from the channels, which gives further possibilities, viz., strong beam, monochromatization, appearance of the central maximum and side maxima and minima, and reduction of the central maximum spot down to the size of a radiation transfer channel.

The herein-proposed invention, as far as the device for carrying into effect the proposed method is concerned, makes provision, like the known device for controlling beams of neutral and charged particles as per U.S. Pat. No. 5,192,869, for an optical system in the form of alternating different-density media that establish radiation transfer channels.

Unlike said known device, the herein-proposed device features said different-density alternating media either differ in electromagnetic properties or are provided with diffraction structures applied to their interfaces.

The surfaces of the alternating media may be in the same or different phase states with respect to their substrate at the interfaces therebetween.

An intervening medium may be interposed between at least two adjacent media, said medium differing from the adjacent media in electromagnetic properties, or being in the phase state other than the adjacent ones.

Presence of diffuse scattering enables the aperture of the device to be increased and hence the optical system to be made faster.

Potential scattering of particles, e.g., potential scattering of neutrons on a magnetized layer coating the substrate surface, adds to the critical angle of reflection, that is, increases the aperture, too.

Application of multilayer structures to the reflecting surface provides a possibility for selection and monochromatization of radiation due to interference of particles on said structures.

Coating the dielectric substrate with a metallic layer makes possible "channeling" of the charged particles through such a medium since otherwise the dielectric gets charged and prevents, with its charge, "channeling" of the particles.

In this case there is displayed difference in properties between the substrate and the reflecting surface because the latter is in fact a metallic layer.

The different-density alternating media may be both homogeneous and structurized in a transverse section with respect to the direction of the radiation transfer, and their structural elements may differ in physical properties and be arranged in said section either unorderly or in an ordered state with the presence of axial symmetry. In the latter case radiation interference arises, which enables the focal spot to be drastically diminished and the radiation to be monochromatized.

In particular, said media may appear as hollow glass mono- or polycapillaries. Such an embodiment thereof features a number of technological advantages.

The optical system may be made as a single or a number of separate sections tandem-arranged in the direction of radiation transfer.

The sections of the optical system may appear, in particular, as different-shape lenses or hemilenses.

For radiation control on one angular coordinate the lenses or hemilenses of the optical system may appear as planar structures.

For separate radiation control on two angular coordinates the optical system may incorporate two sections tandem-arranged in the direction of radiation transfer, the planar structures forming the lenses or hemilenses of the first and second sections being oriented mutually orthogonally.

With the purpose of selecting the transferred radiation as to energy of their particles the optical system may be built up of a number of sections tandem-arranged in the direction of radiation transfer and composed of lenses or hemilenses, as well as a section appearing as a set of reflecting structures parallel to one another and making up an angle with the direction of radiation emerging from the preceding section. To provide a possibility of controlling the energy level in selecting the radiation particles provision may be made in the device for varying said angle.

Difference in the electromagnetic properties of different-density alternating media can be provided, in particular, due to application of a conductive or a superconductive layer.

The end face of the optical system on the side of radiation entrance may be concave with a possibility for the radiation source to be spaced apart equidistantly from all points of the optical system, thus adding to radiation capture.

The end face of the optical system on the side of radiation entrance may be convex, and the optical system may be fashioned as a symmetric or asymmetric lens.

The optical system may also be made with a possibility of placing the radiation source thereinside which in some cases allows of rendering it faster.

Radiation transfer channels may diverge in the direction of radiation transfer so as to reduce the radiation divergence.

Radiation transfer channels are oriented lengthwise the direction of transfer and may be curved, the radius of curvature of the external channels in the plane passing through the longitudinal axis of the optical system being associated with the dimensions of the optical system by the relation $$R=(H-h)/\phi^2,$$

where $R$—radius of curvature of the external channels;

$H, h$—cross-sectional dimensions of the optical system at its entrance and exit, respectively;

$\phi$—required radiation capture angle.

Radiation transfer channels may also have constant cross-section as along the length thereof. In this case the diameters and lengths of the radiation transfer channels are calculated according to the following relation $$l=d^{\phi 2}/\theta_c,$$

where $d$—diameter of the radiation transfer channel;

$l$—length of the radiation transfer channel;

$\theta_c$—critical angle of reflection;

$\phi$—required radiation capture angle.

The walls of radiation transfer channels in the entrance and exit portions of the optical system can make up an obtuse angle therebetween, a feature that provides a possibility for developing a new type of microscope.

Radiation transfer channels in the entrance portion of the optical system may have a constant cross-section along the length thereof, and those in the exit portion of the optical system may be made divergent or convergent, and the radiation transfer channels at the end of the exit portion of the optical system may be bent to one side with respect to the entrance portion thereof.

Provision of divergent channels in the exit portion of the optical system reduces divergence of the exit radiation, while provision of convergent channels suppresses the hard component of the radiation spectrum.

The walls of the radiation transfer channels of the optical system may have either unclosed or closed coaxially arranged surfaces.

The optical system may appear as a bundle of capillaries or polycapillaries, and each channel may have a cross-section variable along the length thereof.

In particular, the optical system may be shaped as a bundle of capillaries having conical surfaces, the parameters of said system being interconnected by the relation $$(\delta\theta_1+\phi_c)\cdot D_1=(\delta\theta_2+\phi_c)\cdot D_2,$$

where $\delta\theta_1$—initial divergence of the quasi-parallel beam;

$\delta\theta_2$—required angle of beam divergence at the exit;

$\phi_c$—cone angle;

$D_1, D_2$—entrance and exit diameters, respectively.

The walls of radiation transfer channels may be coated with a layer absorbing soft X-ray radiation which allows of cutting-off the soft portion of the radiation spectrum.

Radiation transfer channels may have micron and submicron cross-sectional dimensions and be devoid of external supports or support structures. Thus, a possibility arises for controlling high-energy radiation, radiation focusing into a spot measuring closely to the diameter of radiation transfer channel.

In addition, the various particular embodiments of the herein-proposed device may have, either individually or in diverse combinations, the specific features hereinbelow described in detail.

Each of the lenses or hemilenses that form the sections of the optical system may appear as a set of miniature lenses or hemilenses in such a manner that its cross-section is established by the sum of cross-sections of the miniature lenses or hemilenses and of the gaps therebetween.

Miniature lenses may be asymmetrical, that is, the radii of their curvature at the radiation entrance and exit ends may differ, which extends the functional capabilities of the optical system.

The miniature lenses or hemilenses that make part of a set may differ in focal length and radiation capture angle.

In particular, there may differ in focal length and radiation capture angle those miniature lenses or hemilenses one of which are arranged along the periphery of the lens or hemilens they constitute, while the other miniature lenses or hemilenses are located near the longitudinal axis of said lenses or hemilenses.

To attain a desired distribution of the radiation intensity at the exit of the device, cross-sectional dimensions of the miniature lenses or hemilenses may vary across the cross-section of the lenses they constitute, in particular, said dimensions may be variable from the longitudinal axis towards the periphery.

The radii of curvature of miniature lenses or hemilenses in the plane passing through the longitudinal axis of a lens or hemilens may vary steadily as soon as the spacing between the miniature lenses or hemilenses and said axis increases, a feature that makes possible control of the radiation spectrum.

Miniature lenses or hemilenses may have the same radii of curvature in the plane passing through the lens longitudinal axis, and differ in length or cross-section in order to provide the required radiation parameters at the exit from the device.

To transform an initially divergent radiation into a quasi-parallel beam accompanied by its bending and filtering, the optical system may appear as a set of miniature hemilenses curved to the same side.

To transform a divergent radiation into a quasi-parallel beam accompanied by its filtering but without bending, all miniature lenses of set constituting the optical system in the form of a hemilens feature a variable direction of curvature in the plane passing through the longitudinal axis of the hemilens.

Diffraction structures applied to the interfaces of different-density alternating media may be multilayer.

In particular, to transform a divergent radiation beam into several quasi-parallel monochromatic beams, the multilayer structures applied to all interfaces have the same period, and the optical system has one section with the transfer channels established by planes, the length of said channels either increasing from the periphery towards the longitudinal axis of the optical system (with the same interplane distance) or remaining unaffected with said interplane distance decreasing from the periphery towards the longitudinal axis of the optical system.

To transform a divergent radiation beam into a single quasi-parallel monochromatic beam, the multilayer structures applied to the interfaces have a period varying from the periphery towards the longitudinal axis of the optical system.

To transform a divergent radiation beam into a number of quasi-parallel monochromatic beams in two angular dimensions, the optical system comprises additionally a second section positioned past the first one as along the radiation transfer, wherein the radiation transfer channels are formed by the planes orthogonal to the planes of the first section, the second section differing from the first one in focal distance.

To focus a divergent radiation beam the optical system is provided, apart from the aforementioned two sections, with a third and a second section tandem-arranged past the two preceding ones in the direction of radiation transfer but oriented oppositely with respect to the direction of radiation transfer.

A focusing optical system may also appear as paraboloids fitted into one another and having their inner surface provided with a multilayer-structure coating having a variable period.

To transform a quasi-parallel beam with a broad spectral composition into a quasi-monochromatic beam the optical system may appear as a set of square or rectangular channels having multilayer-structure coating.

To transform a quasi-parallel beam with a broad spectral composition into a quasi-parallel beam with two monochromatic lines the optical system may appear as a set of capillaries assembled into a square or rectangle and having their inner surface provided with a multilayer structure with an alternating period.

In a device transforming a quasi-parallel beam with a broad spectral composition into a quasi-parallel beam having three, four, etc. monochromatic lines, the inner surface of square or rectangular capillaries is provided with a coating in the form of alternating multilayer structures differing in the number of periods (that is, three, four, etc.). The adjacent media differ in electromagnetic properties, and the dimensions of the radiation source and the optical system are interconnected by the following inequalities $$d_n < 2f\theta_c + l_c$$

or $$d_n > 2f\theta_c + l_c$$

where $d_n$—diameter of the radiation source;
f—distance from the radiation source to the optical system;
$\theta_c$—critical angle of reflection;
$l_c$—period of the radiation transfer channel.

The radiation source is positioned behind the focal point of the optical system, and the following inequality is satisfied for incidence angles θ

$$0 < \theta < (2-3)\theta_c.$$

For controlling charged particles the multilayer coating applied to the reflecting surfaces may have an amorphous or a crystalline structure, or else a combination of both.

For monochromatization of a parallel radiation beam the optical system comprises a set of capillaries or polycapillaries, the diameters of the radiation transfer channels in said set being less than $d_c = C/\omega_p$ for X-rays, and than $d_c = 1/(N\bar{b})^{1/2}$ for neutrons, where C—velocity of light;

$\omega_p$—plasma frequency of the material coating the inner surface of the channel;

N—concentration of the nuclei;

$\bar{b}$—nuclear amplitude.

In the device having an optical system consisting of a set of capillaries or polycapillaries, control of angular distribution of the radiation intensity is attained due to appropriately selected their length-to-diameter ratio.

The inner reflecting surfaces of the capillaries and polycapillaries are coated with a highly absorptive, a rough, or any other layer that reduces the reflectance of the radiation from the inner surfaces of capillaries and polycapillaries.

In this case they can be used as capillaries featuring a very high aspect ratio (i.e., length-to-diameter ratio of capillaries).

In the device with an optical system in the form of a set of capillaries provided with a fine film applied to the exit end thereof, filtering of a parallel beam is possible.

The device with an optical system in the form of a set of capillaries can be applied for scanning a parallel beam when delivering it to the end face of the set of capillaries within the limits of the critical angle of reflection with respect to the reflecting surfaces of the radiation transfer channels.

A set of capillaries or polycapillaries may be composed of a number of blocks differing in the diameters of the transfer channels so as to obtain several different spaced-apart monochromatic lines.

An optical system of the device may also consist of a lens or hemilens and a Fresnel zone plate, or of a lens or hemilens and a Fresnel-Bragg zone plate.

BRIEF DESCRIPTION OF THE DRAWINGS

To promote understanding the present inventions are hereinafter described in detail with reference to the accompanying drawings, wherein.

Figure 1:
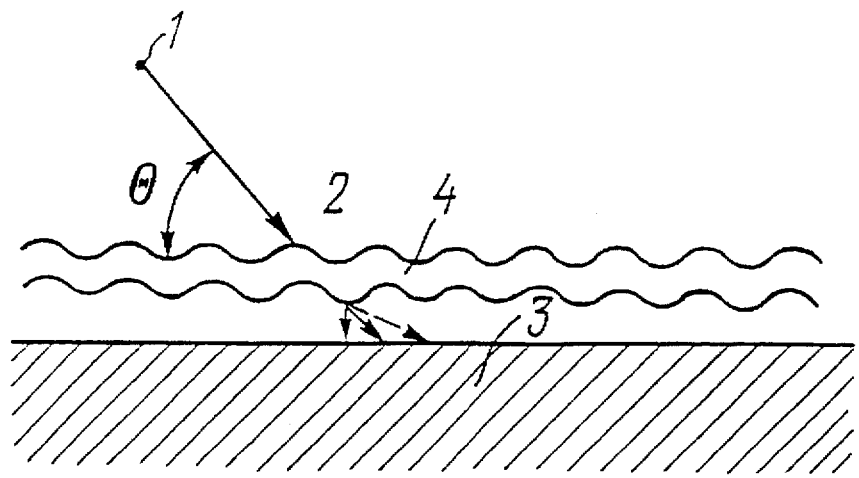
FIG. 1 is a schematic representation of scattering a beam of radiation particles.

In the drawings illustrating the present inventions a solid line indicates the substrate of a reflecting surface, a short-dash line shows the boundary layer on a reflecting surface which may be, depending on the type of the device, rough, conductive or superconductive, magnetized, highly absorbing a definite radiation range, as well a layer composed of multilayer, diffraction, and other structures.

BEST METHODS OF CARRYING OUT THE INVENTIONS

The herein-proposed method for controlling beams of neutral and charged particles consists in simultaneous reflection of a radiation and its scattering on alternating media differing in electromagnetic properties or in phase state, wherein a primary beam contains particles whose direction of motion makes up angles with the plane on which they are incident, said angles lying in a range of from 0 to two critical angles of reflection of a beam of neutral or charged particles, and such beams of neutral or charged particles may be generated with the aid of the radiation, in the alternating media themselves.

Processes of radiation scattering in a substance are studied very much. Thus, for instance, passing of X-rays through a substance gives rise to Compton scattering, passing of charged particles through a substance causes scattering described by the well-known Rutherford formula.

As a matter of fact, charged particles (electrons, positrons, protons, ions) interact with atomic nuclei in accordance with Rutherford formula. When the radiation is incident upon a surface at a small angle, the coefficient of single scattered reflection may reach, depending specific conditions, 0.9–0.98. With said fact in view one can use the concept of multiple scattering, wherein particles are successively scattered while passing through the transfer channel. In this case the geometry is quite the same as in the concept of multiple reflection.

Proceeding from the concept of successive multiple scattering one can focus beams of charged particles, bend said beams through considerable angles, etc. As a rule, magnetic or electric field are used for the purpose.

These known scattering processes can be efficiently used for controlling radiation beams when a complex boundary is present in the substance, e.g., vacuum - medium; vacuum - first medium - second medium; multilayer structures; structures having layers differing in density, etc.

In this case the boundary between two different media may smooth so that at small angles reflection may occur, but may also be not smooth, that is, the control process may occur without mirror reflection. Let a beam of particles from a radiation source 1 (FIG. 1) be incident upon at an angle θ to the interface between two media 2 and 3, of which e.g., the medium 2 is vacuum, and the medium 3 is a solid substance. The interface between the media 2 and 3 is a smooth surface coated with a fine rough layer 4. Angle θ of the beam incidence may exceed the critical angle of total external reflection. As a result of beam scattering on the rough layer 4 part of it acquires angles with respect to the medium 3 lower than the critical, that is, part of the beam gets under conditions of total external reflection as a result of scattering on the rough layer 4.

Here and hereinafter it is assumed, for the sake of simplicity, that the rough layer 4 on which reflection and scattering occur, belongs to the medium 3.

Figure 2:
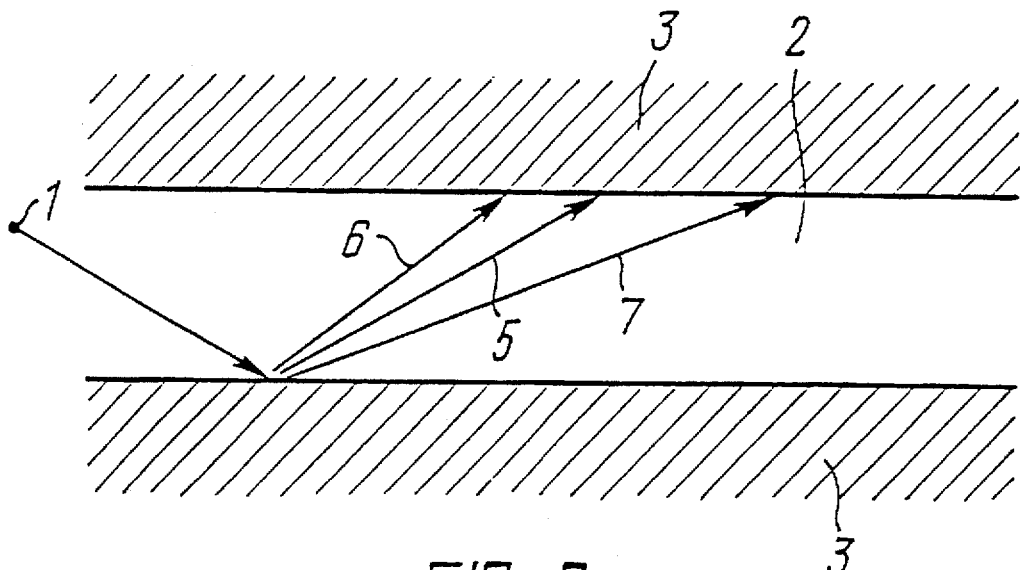
FIG. 2 is a schematic representation of scattering and reflecting a beam of radiation particles.

Now let us consider the concurrent processes of scattering and reflection. The beam (FIG. 2) after having undergone a first scattering on the medium 3, forms a fan of beams (rays)

5, 6, and 7, the ray 5 being a mirror-reflected one, and the rays 6 and 7, scattered rays. If there had been no other medium 3 the ray 6 would have quitted the beam because the angle of its incidence exceeds the critical angle of reflection. It is due to a second scattering on the medium 3 that part of the ray 6 is recaptured during reflection. On the other hand, part of the ray 7 goes beyond the limits of the critical angle of reflection.

Ultimately, as a result of multiple reflection and scattering, a certain part of the initial beam generated by the source 1 emerges from the radiation transfer channel (the medium 2) in the form of a beam nearly parallel to the boundaries between the media 2 and 3.

In the case of a multilayer structure, reflection is accompanied by energy selection due to Bragg law. It is common knowledge that a photon incident on the medium-to-medium boundary at an angle two or three times the critical angle may acquire, as a result of scattering on said rough surface, a smaller angle on the order of the critical one (Joned effect). As a result of subsequent scattering part of such photons fall into the multiple-reflection mode.

Figure 3:
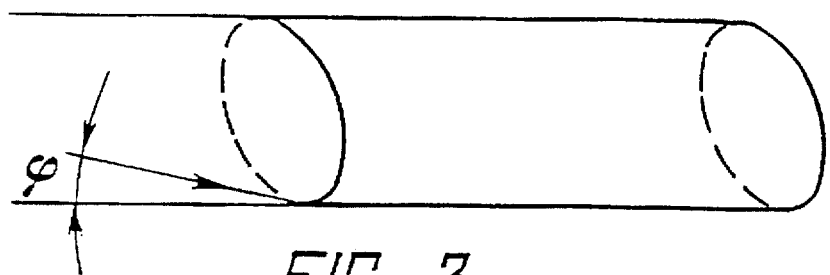
FIG. 3 is a schematic representation of radiation incidence at a large azimuth angle to the tangent of a cylindrical capillary.

When the reflecting channel has a cylindrical, conical, or some other shape, the photon can fall into the multiple-reflection mode with an initial angle of incidence on such a channel much greater than the critical angle of reflection. In this case the total vector of the initial momentum of a particle is to be divided into the radial and azimuthal portions (FIG. 3). Azimuthal angle may vary with respect to the tangent line at the point of incidence from 0 to 2, and radial angle may amount to two or three critical angles.

The aforementioned feature is of paramount importance for large-size radiation sources. When using only the processes of multiple reflection, the size of the radiation source is limited to the following condition $$b < 2f\theta_c + d,$$

where $\theta_c$—critical angle of reflection;
d—dimension of the channel;
f—distance from the radiation source to the optical system.

Figure 4:
FIG. 4 is a schematic representation of the position assumed by the radiation source past the focal point of the optical system.

Actually, most frequently encountered sources fail to satisfy this condition. For instance, a majority of powerful X-ray tubes measure from a few millimeters to one or two centimeters, neutron sources in a reactor measure up to a few tens of centimeters, very large dimensions have also stationary plasma sources. Very large sources need not be positioned at the lens focal point (FIG. 4). A large-size isotropic source is arranged in a region 8 past the focal point. Each of the points of the source "sees" its particular transfer channel, e.g., particles from the source in a region 9 gets to a channel 9', those from a region 10, to a channel 10', and so on. In this case all the particles intersect the focus of the system located at the point 0. Thus, the proposed method can be carried into effect when using not only point and quasi-point sources but also large-and very large radiation sources.

In case of point or quasi-point radiation the efficiency of the optical system can be improved by varying its geometry in such a manner that not only photons featuring small angles of incidence in the range of $0 \leq \theta \leq \theta_c$ but also photons having large initial angles can get to the transfer channel.

Alternating media may appear as a multilayer structure, wherein a denser layer is adjacent to a less dense one.

In such a case a less dense layer serves as the radiation transfer channel for photons, neutrons, and positively charged particles.

Said alternating layers can be in the same phase, e.g., be amorphous or crystalline, can also be in different phases, e.g., the amorphous layer can alternate with the crystalline one. In this case a potential of repulsion from a denser medium arises for positively charged particles. Said potential may amount to 20–30 eV depending on the composition of said layer. In this case the angle of potential scattering equals $(U/E)^{1/2}$, where E denotes particle energy, and U indicates repulsive potential. With such potential scattering a particle approaches the layer a distance on the order of from fractions of an Ångström unit to a few Ångström units (depending on the initial angle of grazing). For negative particles, e.g., electrons the situation is the reverse, i.e., they are transferred on a denser layer.

In some cases alternating layers may appear as a combination of a denser layer and vacuum. In such an occasion the denser layer itself or the boundary thereof may be electrically charged or have magnetic properties.

For example, the presence of a magnetic layer makes control of neutral beams more efficient.

Of much importance for practical purposes is the case where the denser layer is either superconducting or coated with a superconductive layer. Such being the case, a charged particle does not approach the surface too closely because it is repulsed by a magnetic field built up in the layer by the charge of the charged particle itself (Meissner effect). A very interesting opportunity arises to control the path of charged particles because a possibility is provided for multiply repeated bend of a particle by analogy with a synchrotron ring, without any noticeable loss of particle intensity.

One of the variants of the proposed optics is a combination of reflective optics with multilayer optics, whereby aberration may be drastically reduced and the lens be rendered faster. Though such a combination involves a disadvantage concerned with the intensity, in some instances this may prove an advantage, too.

The present-day multilayer coating application techniques, including application to intricately shaped geometric objects, have gained much success. For instance, it is attainable to apply multilayer coatings to diversely shaped hollow glass capillaries.

In such a case the element of the optics may be, e.g., a paraboloid having its inner surfaces coated with a multilayer structure, or a system of two-dimensional structures specially oriented to the radiation source and coated with a number of layers, or else a system of square or parallel rectangular capillaries having an appropriate multilayer structure, and so on.

The proposed optics may be constituted, as has been stated before, by a multilayer structure, wherein a denser layer is adjacent to a less dense one. In this case an interaction potential stemming from Coulomb forces arises at the border between said media. This potential has much in common with an averaged potential in channeling particles along atomic planes of crystals (such a potential was for the first time introduced by the Author as far back as 1979). In this case positive particles are transferred along a less dense layer, while negative particles, along a denser layer.

Transfer of neutrons along such a spray-deposited channels is studied well. It turns out, however, that charged particles can also be transferred along such a structure.

By imparting any appropriate shape to such a structure the latter can be used for focusing, bending, etc. charged particles.

The aforesaid structure can also be used for controlling X-ray particles and gamma-quanta.

A combination of reflective optics with multilayer structures provides for a number of substantial advantages.

Figure 5:
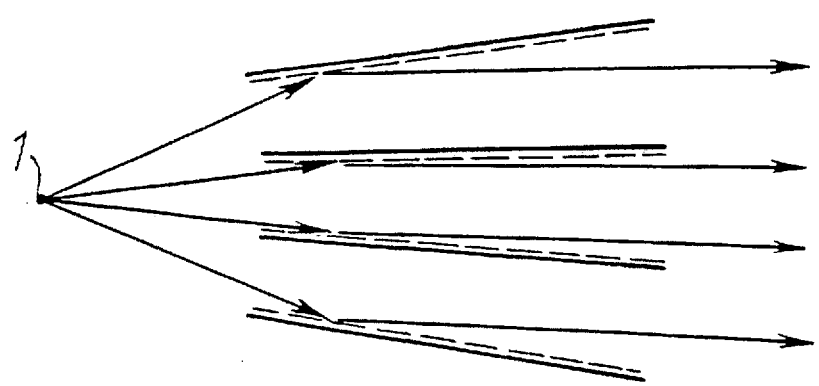
FIG. 5 shows an embodiment of the reflecting surface having a multilayer-structure coating.

Now let as consider, e.g., transformation of a diverging radiation into a quasi-parallel one. In this case it is possible to use a single reflection on special geometry of two-dimensional multilayer reflecting planes (FIG. 5). These planes are so oriented to the radiation source that upon passing through said planes the radiation becomes quasi-parallel. Two construction embodiments of the reflecting surfaces are possible for forming such a quasi-parallel beam, viz., according to a first variant said planes are spaced equally apart but their length increases from the periphery towards the center; according to a second variant all the planes are equal in length but the interplane spacing decreases from the periphery towards the center. A total capture angle of such an optical system equals $4\theta_c$, where $\theta_c$ denotes critical angle of reflection from a plane. When depositing multilayer coatings on surfaces said angle may be very large (especially for soft X-rays and ultracold neutrons).

When the period of all multilayer structures on all reflecting surfaces is the same, such optics not only transforms efficiently a diverging radiation into a quasi-parallel one but also establishes a plurality of quasi-monochromatic beams. The number of such beams equals N/2, where N denotes the number of reflecting planes. Energy of said beams is determined by the initial angles of incidence of the radiation on one plane or another, obeying Bragg diffraction law.

Whenever the period of multilayer structures varies steadily from the periphery towards the center, one can attain that the quasi-parallel beam be in effect a single quasi-monochromatic beam.

The aforeconsidered geometry of the optical system transforms a diverging radiation into a quasi-parallel one in one angular dimension only. To obtain a quasi-parallel beam in both angular dimensions, it is necessary to provide a second optical system with a different focal length so that said second system be likewise oriented to the radiation source but that its reflecting two-dimensional planes be orthogonal to the first optical system.

It is quite obvious that a quasi-parallel beam can be directed to the aforesaid system from the opposite side, and said beam can be point-focused.

When using four reflecting systems the diverging radiation emerging from the source can also be point-focused.

To transform a diverging radiation into a quasi-parallel one accompanied by beam monochromatization use may be made of a paraboloid at the focal point of which the radiation source is positioned. In order to produce a monochromatic radiation, the pitch of the multilayer structure applied to the paraboloid inner surfaces should vary lengthwise said paraboloid.

For hard radiation use can also be made of a system of paraboloids fitted into one another, the radiation source being positioned at the focal point of said paraboloids.

When a multilayer structure is used, a maximum reflection angle for hard radiation is determined by the formula $$\theta = \lambda/2L,$$

where

L—period of the multilayer structure;
λ—radiation wavelength.

A/t present the period $L \approx 10$ Å is technologically attainable, that is, with energy of photons on the order of 24 keV (0.5 Ångström unit) a reflection angle $\theta \approx 5 \cdot 10^{-2}$ radian is attainable. This is about 40 times the critical angle of total external reflection from glass for said energy value ($\theta_c$ for glass with said energy value equals about $1.2 \cdot 10^{-3}$ radian).

To control hard radiation which has a larger size and is parallel, it is better to use multilayer structures applied to, e.g., a capillary or polycapillary set built up of square or rectangular channels (FIG. 6) rather than the traditional multilayer structures.

The size of said set is on the order of that of the beam itself, whereas with the use of a traditional multilayer structure applied to a plane the size of said plane must be of the order of L/θ, where L is the beam size, and θ is angle of reflection.

For example, with L=10 cm and $\theta \approx 5 \cdot 10^{-2}$ radian, the plane size should be 2 m. It is, however, a very difficult task to apply a multilayer structure to such a large area nor it is easier to provide a very smooth surface having such size and suitable for application of a multilayer structure thereto.

On the other hand, to assemble, e.g., a capillary structure measuring about 10 cm is not a very complicated task.

In some instances it is necessary to have a number of similarly space-oriented quasi-parallel beams differing in wavelength. For example, in angiography examination of cardiac vessels involves use of two beams measuring (15·15) cm² near the energy of 33 keV before and after the absorption line of iodine which serves as a contrast medium.

To this end use may be made of a set of rectangular or square capillaries so coated with a multilayer structure that the period of said structure alternates, thus establishing, after reflection, two different similarly space-oriented quasi-monochromatic beams.

Thus, there can be established also three, four, etc. different quasi-monochromatic beams. The size of a beam can be on the order of 10 cm, and the capillaries may be of the order of 0.1 mm or less, whence such a geometry opens broad possibilities.

Alternating media may be in different phase states. For charged particles crystalline structures are used as a reflecting medium, e.g., a layer having a thickness of tens of Ångström units. Reflection from said layer occurs similarly to that during channeling between the atomic planes of a crystal.

The critical angle of reflection of neutrons in a layer, wherein a magnetic field is present is determined by the formula $$\theta_c = \lambda[N\overline{b}/\pi \pm (m/2\pi^2\overline{h}^2)\mu B]^{\frac{1}{2}},$$

where

N—nuclear density;
λ—neutron wavelength;
$\overline{b}$—nuclear coherent scattering amplitude;
μ—neutron magnetic moment;
m—neutron mass;
B—magnetic induction;
$\overline{h}$—Planck's constant.

The presence of two signs, plus and minus, and hence two angles is concerned with two possible polarizations of the neutron spin.

With high-intensity magnetic fields when $N\overline{b} < (m/2\pi\overline{h}^2)$ μB, a single critical angle of reflection is observed, and totally reflected neutrons are polarized.

That is why when establishing, e.g., two- or three-dimensional structures one can control not only the paths but also polarization of neutrons.

One can establish alternating media, wherein the reflecting medium is in fact a magnetic mirror, e.g., a thin cobalt mirror. By using alternating media differing in magnetic properties one can increase critical angles of reflection without reducing the reflectance.

The herein-proposed method for controlling beams of neutral and charged particles will become more evident and understandable from the following consideration of a device for its carrying into effect with reference to the various specific embodiments and applications thereof.

Figure 7:
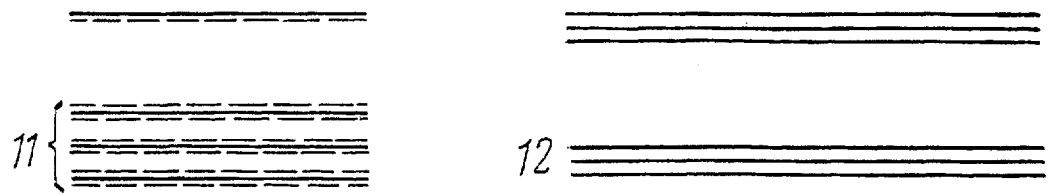
FIG. 7 shows an embodiment of the reflecting medium.
Figure 8:
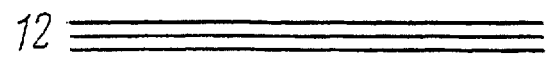
FIG. 8 shows an embodiment of a reflecting medium with an intervening medium.

In the device proposed herein at least one of the reflective media of the optical system may appear as alternating media differing in electromagnetic properties or being in different phase states (Ref.No.11 in FIG. 7), or else an intervening medium (Ref.No.12 in FIG. 8) may be interposed between two adjacent media, said intervening medium likewise differing from the adjacent media in electromagnetic properties or in phase state.

Figure 9:
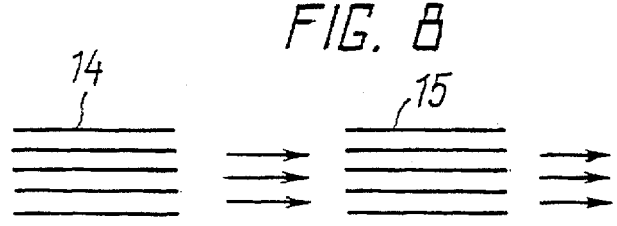
FIG. 9 shows an embodiment of an optical system shaped as a number of sections.

A sectional construction arrangement of the optical system (FIG. 9) is also possible, wherein all alternating media in sections 13, 14, and 15 differ in electromagnetic properties or are in different phase states. An extended radiation source 16 is placed at the entrance of the sectional optical system shown in FIG. 9.

Figure 10:
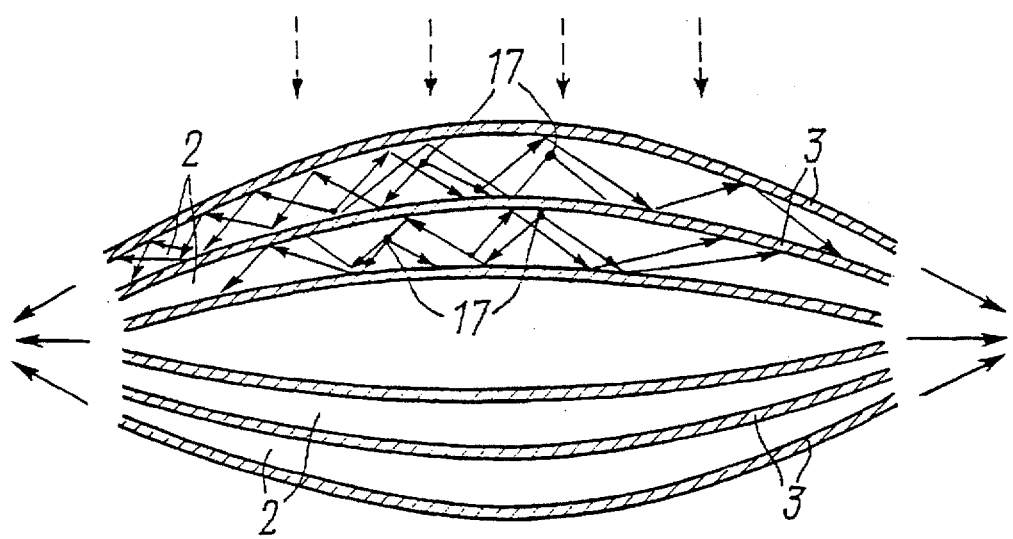
FIG. 10 shows an embodiment of the device, wherein the radiation source is located inside the optical system.

Proposed herein is also an embodiment of the device, wherein radiation sources 17 are accomodated inside the optical system (FIG.10). The meaning of Ref.Nos.2 and 3 in FIG. 10 is the same as in FIG. 2.

Figure 11:
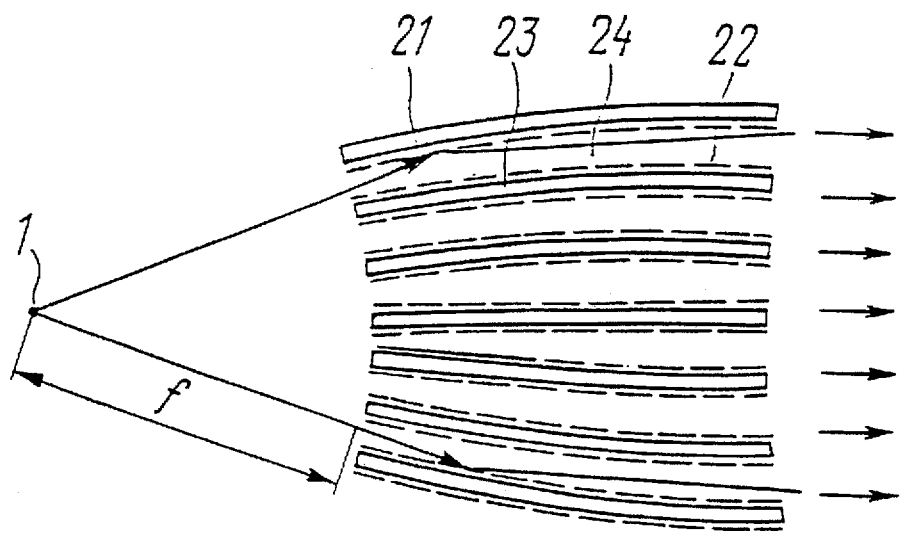
FIG. 11 is a schematic representation of an optical system with a quasi-point radiation source.

The device for controlling beams of neutral and charged particles as shown in FIG. 11 operates as follows.

A beam of neutral or charged particles emitted by the source 1, is incident on an optical system 21 at an angle $\theta$ to the channel surface. Said angle $\theta$ may be both in excess of the critical angle of total external reflection and below it. As a result of multiple reflection and scattering of the radiation on an inner surface 22 of reflecting walls 23 of channels 24, part of the radiation is transferred along the channels 24, the radiation transfer path being set by the geometry of the channels.

In the herein-proposed device the size 1 of the radiation source, the channel diameter d, and the distance f from the source to the optical system are interconnected by the inequality $d > 2f\theta + 1$, which allows of using a much larger radiation source and makes it possible accordingly to considerably increase radiation density at the output of the optical system.

Figure 12:
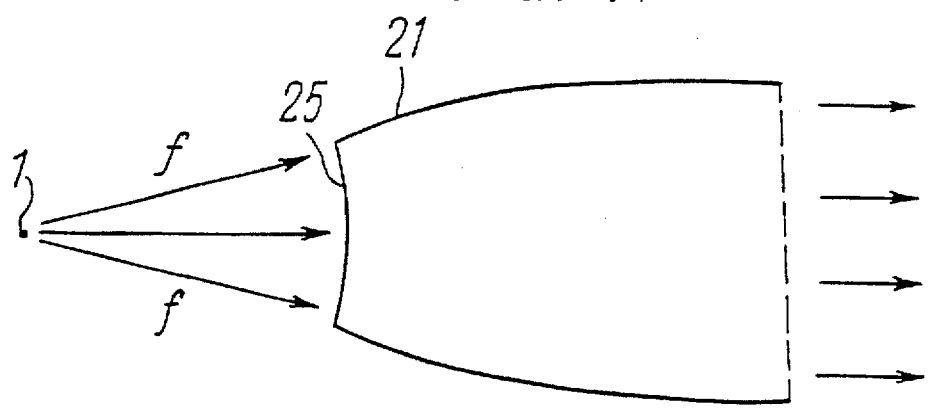
FIG. 12 shows an embodiment of an optical system shaped as a hemilens having its end face concave on the side of radiation entrance.

An embodiment of the optical system with a concave end face 25 (FIG. 12) enables a true focal length for the optical system to be obtained.

Figure 13:
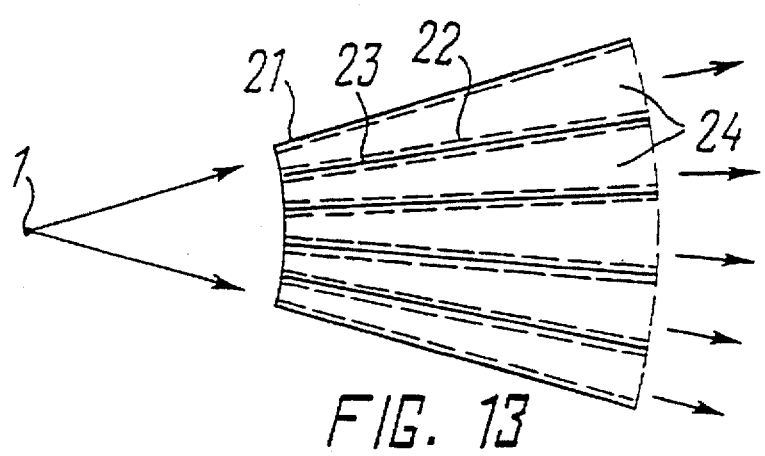
FIG. 13 shows an embodiment of an optical system having radiation transfer channels diverging in the direction of radiation transfer.

With all transfer channels oriented to the source (FIG. 13) a possibility arises to capture the entire radiation generated by the source 1 and incident on the end face of the optical system 21, with a small exception of that part of the radiation which is incident upon the walls 23 of the channels 24.

Diverging channels of the optical system may have convex walls (FIG. 14), and the following relation must be satisfied $$R = (H-h)/\phi^2,$$

where

R—radius of curvature of the external channels;

H, h—dimensions of the optical system at its entrance and exit, respectively;

$\phi$—radiation capture angle.

The channels of the optical system in the entrance portion thereof may be divergent, and in the exit portion of the optical system the may be of a constant diameter as for length (FIG. 15), or be divergent as for length in both the entrance and the exit portions of the system (FIG. 16), the walls of the channels in the entrance and the exit portions of optical system defining an obtuse angle.

Figure 17:
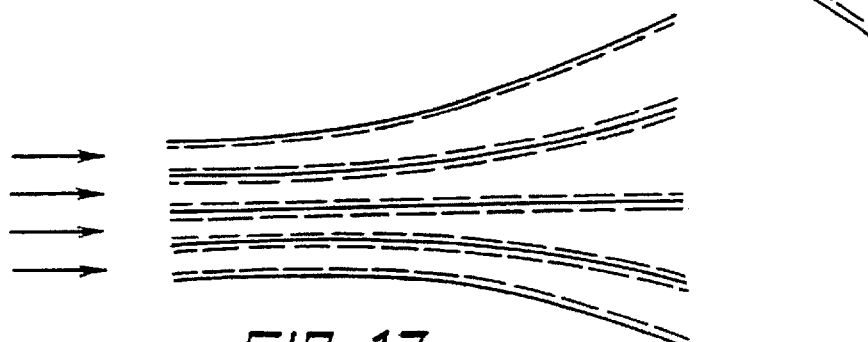
FIG. 17 shows an embodiment of an optical system having radiation transfer channels featuring a constant cross-section in the entrance portion thereof, and diverging towards the direction of transfer in the exit portion thereof.
Figure 18:
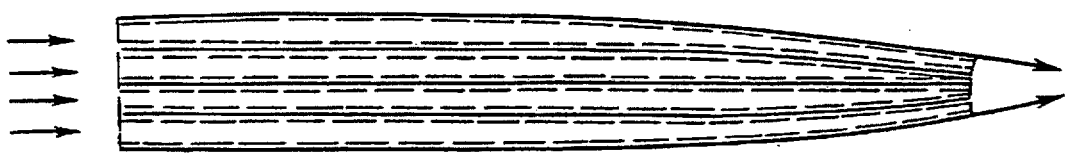
FIG. 18 shows an embodiment of an optical system having radiation transfer channels featuring a constant cross-section in the entrance portion thereof, and converging towards the direction of transfer in the exit portion thereof.
Figure 19:
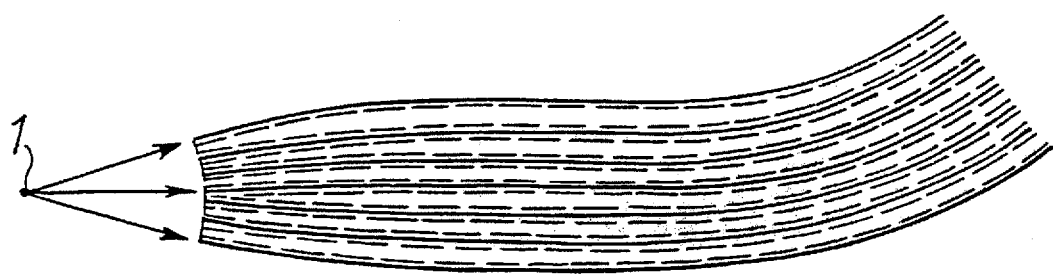
FIG. 19 shows an embodiment of an optical system, wherein radiation transfer channels at the end of the exit portion thereof are bent to the same side.

Radiation transfer channels in the entrance portion of the optical system may have a constant cross-section as for length, and those in the exit portion of the optical system may be divergent (FIG. 17), or the channels in the exit portion of the optical system may be of constant cross-section, and in the exit portion of said system they may be convergent as for length (FIG. 18). In addition, in any embodiment of the optical system the radiation transfer channels at the end of the exit portion of the optical system may be bent to one side with respect to the entrance portion thereof (FIG. 19).

Figure 20:
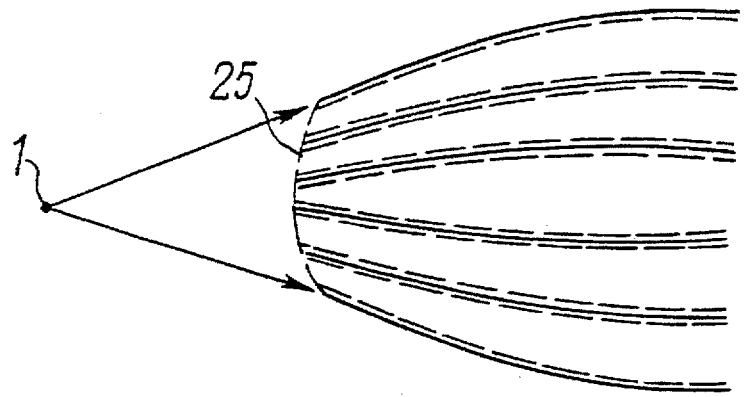
FIG. 20 shows an embodiment of an optical system having a convex end face on the side of radiation entrance.

An end face 25 of the optical system may be convex on the side facing the radiation source (FIG. 20).

Figure 14:
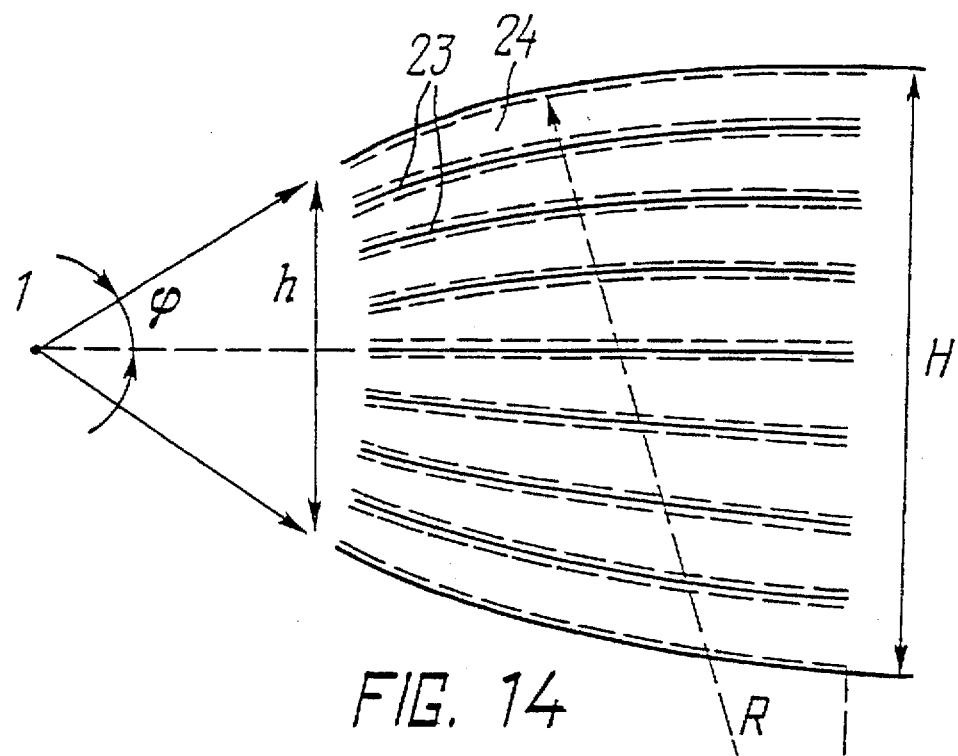
FIG. 14 shows an embodiment of an optical system similar to that of FIG. 13, but with convex walls of the radiation transfer channels.
Figure 15:
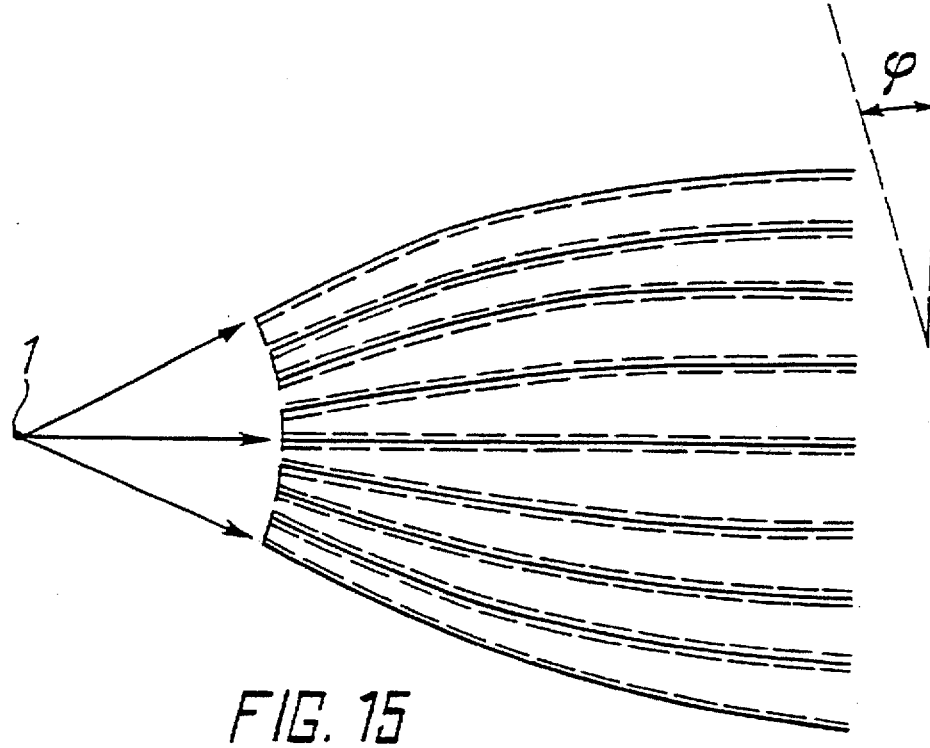
FIG. 15 shows an embodiment of an optical system having radiation transfer channels diverging in the direction of radiation transfer in the entrance portion of the system and featuring a constant cross-section in the exit portion thereof.

Embodiments of the optical system presented in FIGS. 14 and 15 enable a divergent radiation to be transformed into a quasi-parallel one.

Figure 16:
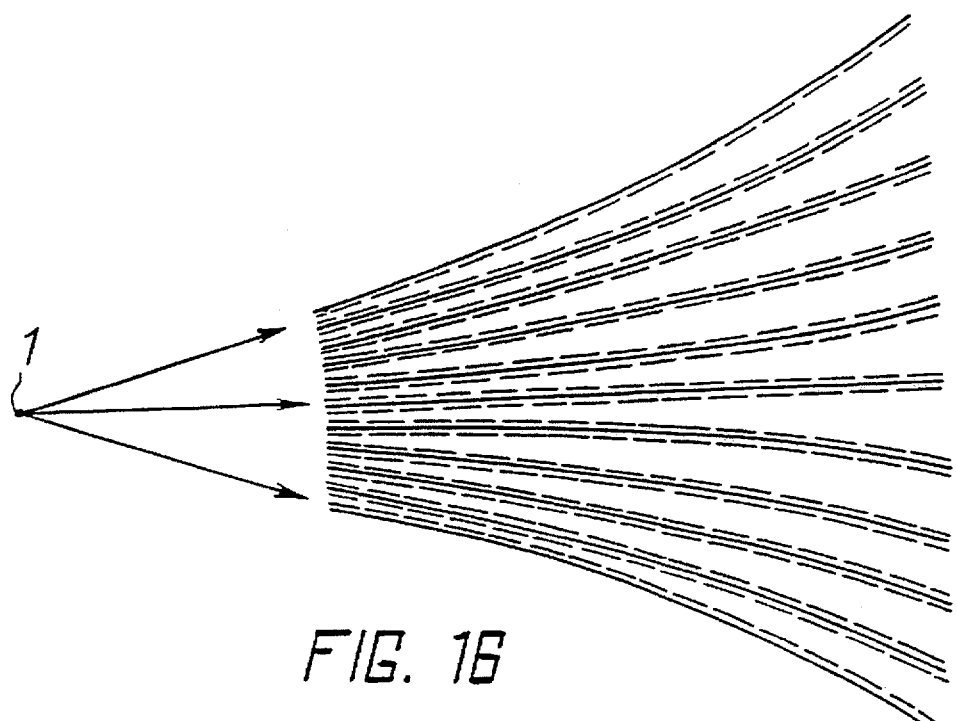
FIG. 16 shows an embodiment of an optical system having radiation transfer channels diverging in the direction of radiation transfer so as to transfer it along the entire length thereof, and featuring the channel walls making up an obtuse angle in the entrance and exit portions of the channels.

Optical systems presented in FIGS. 16 and 17 are expedient to be used for producing an enlarged image of the object placed in front of the optical system, the embodiment of FIG. 16 being suitable for a point source, and that of FIG. 17, for a quasi-parallel one. Precision of the image produced approximately equals the exit channel size, which is of essential significance for application of the present device in microscopy and tomography.

The device depicted in FIG.18 is adapted for focusing a quasi-parallel radiation generated by the source 1. The optical system as shown in FIG.19 featuring the transfer channels bent to the same side, enables the hard portion of X-rays to be cut off which is of much importance for medical applications of the proposed device.

To get rid of the soft portion of X-rays the channel wall surfaces are recommended to be coated with a layer capable of absorbing said radiation component.

An optical system with the convex entrance end 25 shown in FIG. 20 is for transforming a divergent radiation into a quasi-parallel one and rendering said radiation homogeneous throughout its exit cross-section. The periphery transfer channels in said system are shorter but the radiation is bent therein to a greater angle than in the central channels, and radiation losses occurring in the longer central channels approximate those in the shorter but more sharply bent peripheral channels.

Figure 21:
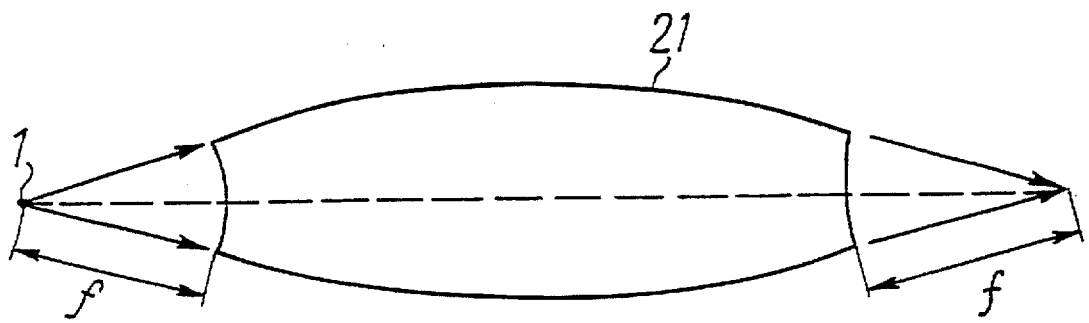
FIG. 21 shows an embodiment of an optical system shaped as a symmetric lens.
Figure 22:
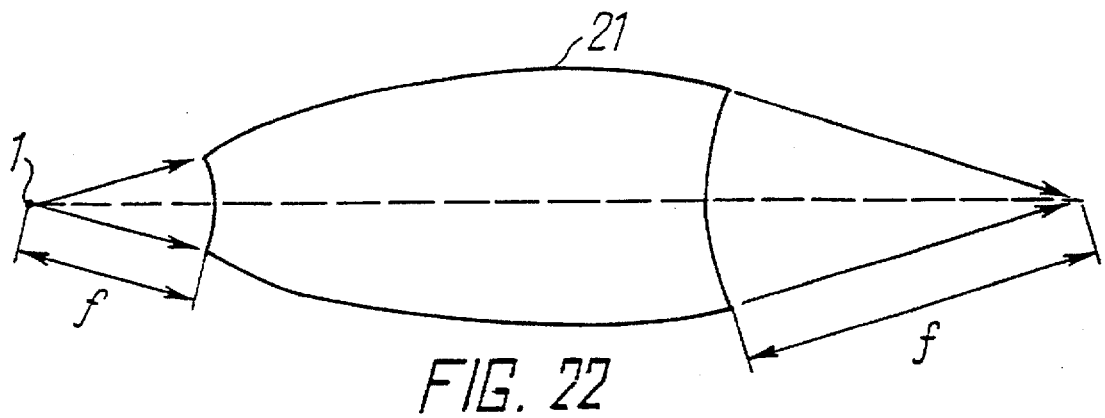
FIG. 22 shows an embodiment of an optical system appearing as an asymmetric lens having different focal lengths at its entrance and exit.
Figure 23:
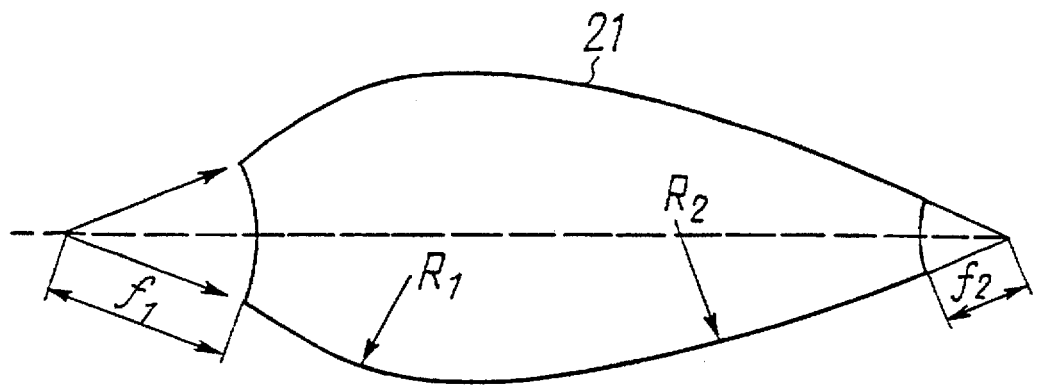
FIG. 23 shows an embodiment of an optical system similar to that of FIG. 22 but having its lens with different radii of curvature.

The aforementioned embodiments (FIGS. 11–20) of the optical system are in effect a hemilens. By putting two such hemilenses together one can obtain a lens which may be either symmetrical (FIG. 21) or asymmetrical (FIGS. 22, 23).

Optical systems in the form of a symmetric lens (FIG. 21) or an asymmetric lens (FIGS. 22, 23) can find application for focusing a source-generated divergent radiation.

Optical systems illustrated in FIGS. 20–23 can be used for contact and projection X-ray lithography.

Furthermore, radiation transfer channels may have both unclosed (FIG. 24) and closed (FIG. 25) surfaces. Closed channel surfaces may be arranged both coaxially and parallel to each other. In the latter case the optical system may appear, e.g., as a set of reflecting structures (FIG. 26), and each of said structures may in turn be composed of smaller reflecting layers, capillaries, etc. (FIG. 27).

Figure 24:
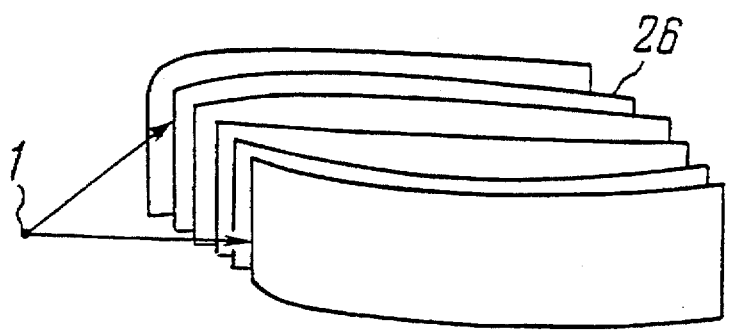
FIG. 24 shows an embodiment of an optical system having radiation transfer channels formed by unclosed surfaces of their walls.
Figure 25:
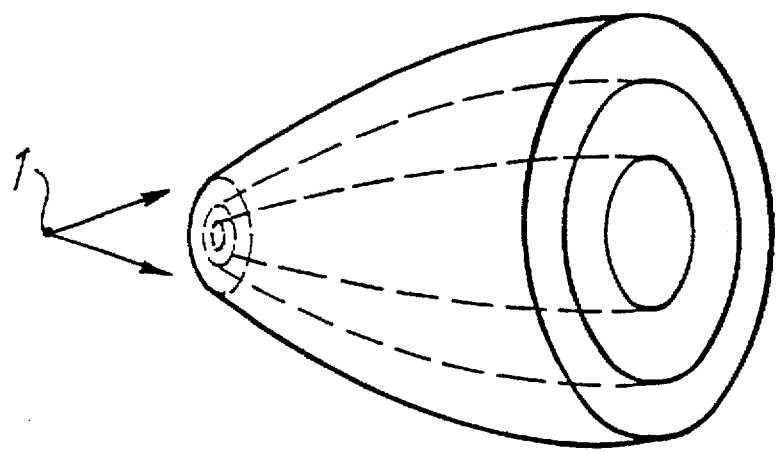
FIG. 25 shows an embodiment of an optical system having radiation transfer channels formed by closed coaxially arranged surfaces of their walls.

For focusing a divergent radiation or transforming it into a quasi-parallel coplanar one use may be made of an optical system built up of planar structures 26 and presented in FIG. 24.

Figure 26:
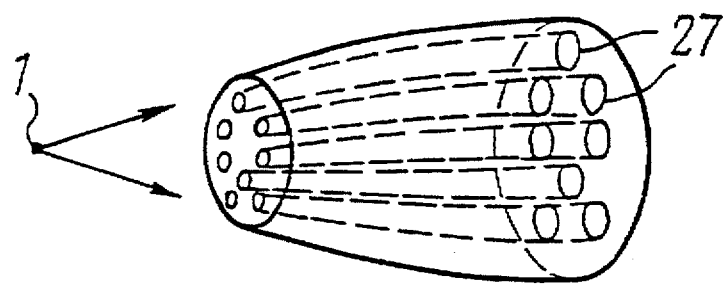
FIG. 26 shows an embodiment of an optical system having radiation transfer channels formed by a bundle of capillaries.
Figure 27:
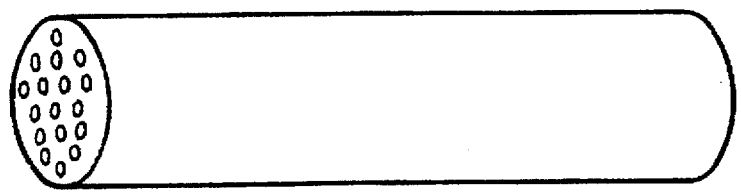
FIG. 27 shows an embodiment of a polycapillary having a constant cross-section in the direction of radiation.

It is most promising to make use of an optical system shaped as a bundle of curved capillaries 27 (FIG. 26). It is expedient in this case to use a polycapillary, i.e., a miniature optical system (FIG. 27) as the radiation transfer channel. In this case said optical system is essentially a set of parallel-arranged miniature optical systems which makes it possible to enhance many times the effect of the optical system as a whole.

Figure 28:
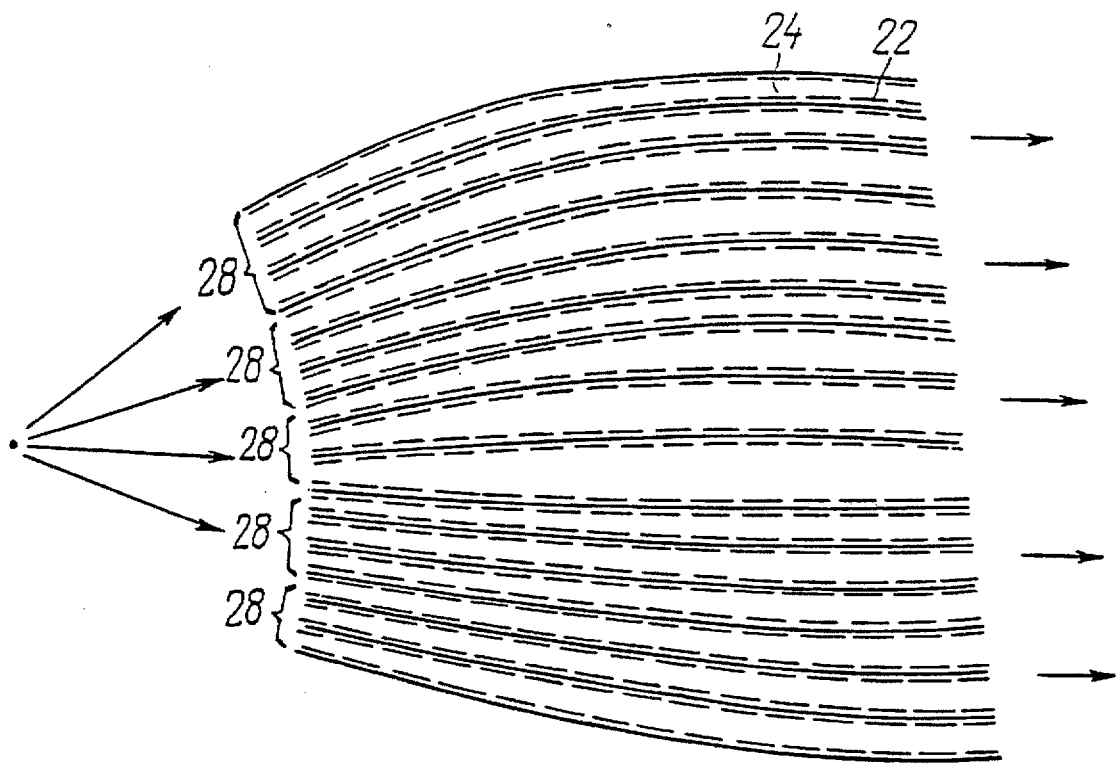
FIG. 28 shows an embodiment of an optical system fashioned as a set of miniature hemilenses.
Figure 29:
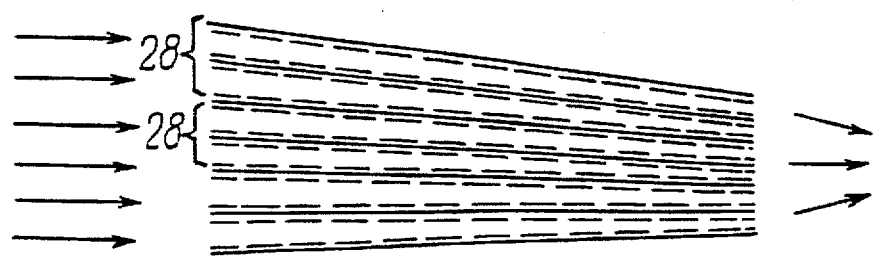
FIG. 29 is an embodiment of an optical system in the form of a set of miniature conical hemilenses.
Figure 30:
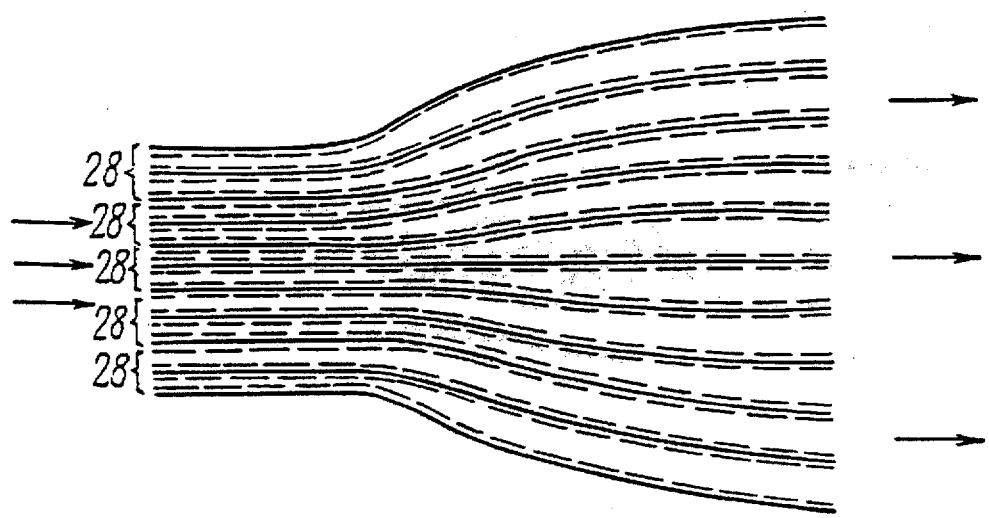
FIG. 30 is a schematic representation of the radiation transfer channels of the optical system which alternate the sign of the radii of curvature thereof.

An important trend in the proposed optics may be an optical system appearing as a set of miniature lenses, hemilenses, etc. Such sets of miniature hemilenses 28 are represented in FIGS. 28, 29, and 30.

A miniature lens is as a rule a single barrel-shaped capillary having a maximum diameter of as low as 0.1–1 mm. This polycapillary is filled with a few thousands or few tens of thousands of hollow channels having the cross-section variable as for their length in such a manner that all the channels may be oriented to a single point.

Miniature lenses can easily be put into a single set of hundreds or thousands of miniature lenses or hemilenses, involving no use of any support elements for forming and retaining the longitudinal profile of an optical system. The effect of such an optical system is augmented many-fold compared with the case where the optical system is constituted merely by capillaries or polycapillaries.

A set of miniature lenses provides many new possibilities, e.g., a lens can have two, three, etc. focal lengths, for which purpose the set can be divided into two, three, or more layers, each consisting of miniature lenses differing in focal length.

An optical system illustrated in FIG. 28 represents a novel type of optical system, that is, a set of miniature hemilenses. Each of such miniature hemilenses has a plurality of channels whose diameter and radius of curvature are variable for length. Diameter of the hemilenses themselves and their radius of curvature with regard to the axis of symmetry of the optical system are also variable.

Such an optical system, wherein its channels feature the size at micron- and submicron level, are manufactured, using the technique of drawing intricately shaped geometric figures, in an appropriate-configuration furnace and in a definite temperature field. These lenses are named the fourth-generation lenses.

An optical system depicted in FIG. 29 and shaped as a bundle of conical lenses, is capable of efficiently focusing a quasi-parallel radiation. In addition, it allows of suppressing the hard portion of the radiation spectrum. This is due to the fact that as the radiation passes along the channels, the angle of reflection with respect to the channel walls increases for both photons and neutrons. Insofar as a harder radiation has a smaller angle of reflection, iris high-energy photons and neutrons that are first to quit the multiple reflection mode.

In one of the embodiments of the present optical system its capillaries have a conical surface whose dimensions are interconnected by the relation $$(\delta\theta_1+\phi)\cdot D_1=(\delta\theta_2+\phi)\cdot D_2,$$

where $\phi$—cone angle;

$\delta\theta_1$, $\delta\theta_2$—initial and final beam divergence, respectively;

$D_1$, $D_2$—respective entrance and exit diameters of the optical system.

In this case $$\phi=(D_2-D_1)/2L,$$

where

L—length of the optical system.

In order to cut off the soft spectral portion as well so as to obtain a quasi-monochromatic spectrum from a complex spectrum, an appropriate filter may be placed in front of or behind the optical system, or the walls of the radiation transfer channel may be coated with a material capable of efficiently absorbing the soft spectral portion.

Provision of reflecting layers having a laminated structure (Ref.No.11 in FIG. 7) makes it possible not only to transfer the radiation but also to selectively take up part of it. The resultant interference in this case increases drastically the critical angle of reflection and the reflectance.

Provision of the small intervening layer 12 (FIG. 8) may in many cases increase sharply the efficiency of the entire optical system. For instance, when transferring neutrons said layer may be ferromagnetic, whereby the angle of reflection is increased. When transferring charged particles said layer may be crystalline, whereby reflection occurs similarly to channeling of particles in crystals.

In the case of a sectional optical system (FIG. 9) the sections 13, 14, and 15 differ in reflection characteristics. The section 13 having a higher plasma frequency captures the radiation from the source 16 in the limits of several $\theta_c = \hbar\omega_p/E$ and transfers it. The next section 14 captures part of said radiation within the limits of several $\theta_c = \hbar\omega_p/E$ which enters the section 15, and so on. It is due to the effect of multiple rescattering and reflection that a radiation with high angular density and low divergence may be obtained after the last section.

In an embodiment of the device as shown in FIG. 10 without an external radiation source, the optical system having the transfer channels 2 may be irradiated by an electron beam (indicated with dashed arrows), with the result that X-ray radiation is generated inside the optical system and is emitted isotropically in all directions. Part of said radiation generated in the radiation transfer channel and incident on the reflecting walls at an angle less than the critical, is captured into the process of multiple reflection and scattering similar to that described before.

An embodiment of the device illustrated in FIG. 5 represents the planar-type optical system transforming a divergent radiation into a quasi-parallel one by virtue of a single reflection. The reflecting surfaces are coated with a multi-layer structure which allows of simultaneously monochromatizing the radiation.

Figure 6:
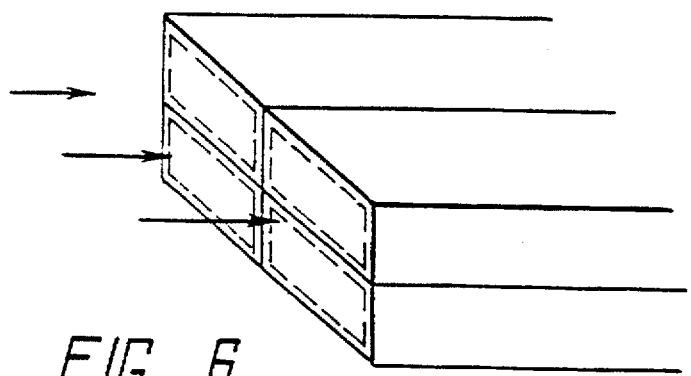
FIG. 6 is a schematic representation of incidence of a quasi-parallel beam on a parallel rectangular set of capillaries coated with a multilayer structure.

FIG. 6 is a schematic representation of a rectangular optical system coated with a multilayer structure which allows of efficiently controlling rather hard radiation.

In an optical system of FIG. 30 radius of curvature of the reflecting structures may alternate the sign so as to filter off the hard radiation component.

In the case of simultaneously using multiple reflection of radiation on alternating media differing in physical properties and scattering of said radiation, a possibility arises for efficiently controlling said radiation, and devices carrying said method into effect render it possible to introduce said method into diverse fields of engineering.

Diameter of a transfer channel of an optical system may be less than the critical diameter $d_c$ with the resultant interference phenomena. For X-ray radiation $$d_c = C/\omega_p,$$

where

C—velocity of light;

$\omega_p$—plasma frequency of the material coating the channel inner surface;

For neutrons $$d_c = 1/Nb^{1/2},$$

where

N—nuclear concentration;

b—nuclear amplitude ($b \approx 10^{-13}$ cm).

Diameter of a transfer channel of an optical system may be less than the critical diameter $d_c$ with the resultant multimode radiation transfer so that a broad radiation spectrum gets into the transfer channel, and after having passed through said channel the radiation is monochromatized.

Thus, one can control the radiation spectrum by changing the diameter of the optical system transfer channels or by building up the optical system of a number of sections with the channels differing in diameter.

A set of capillaries or polycapillaries, wherein the diameter of the radiation transfer channels is substantially smaller than the channel length, appears as a two-dimensional diffraction grating. When use is made of a parallel monochromatic radiation, the end of each channel is in fact the radiation source. In this case if $\lambda/d<1$, where $\lambda$ denotes wavelength, and d indicates channel diameter, an angular width of the diffraction maximum lies in the plane square with the axis of said set.

The number of channels, that is, the number of radiation sources per square centimeter, in the fourth-generation lenses amounts at present to $10^9$–$10^{10}$ insofar as the intensity in the diffraction maximum appears as the square of the number of channels, so a very high radiation density is attainable in a small volume.

There are many ways to produce a parallel monochromatic beam.

To draw an example, in the case of a synchrotron radiation, a crystal-reflector in conjunction with a filter is used for beam monochromatization. Whenever an X-ray tube is used a hemilens can be positioned past the radiation source, and then a crystal-monochromator aimed at additional monochromatization and enhanced parallelism. Next, once a parallel monochromatic radiation has been produced, use may be made of a system made up of a parallel set of capillaries or polycapillaries featuring an appropriate ratio between the diameter and length of the capillaries and the radiation wavelength.

With a view to additionally intensifying the radiation density, a hemilens may be installed instead of said set so as to combine diffraction with reflection. In this case the focal plane, wherein the diffraction maximum displays the maximum brightness, is located at the hemilens focal point.

The aforementioned diffraction systems are basically new compared with the traditional diffraction gratings because they work in transmitted rather than in reflected rays.

A technical difficulty is encountered in filtering broad beams of soft X-rays, concerned with a necessity of retaining a fine film in a high pressure gradient which is the case with, e.g., filtering a synchrotron radiation. To overcome such difficulty, a set of capillaries may be used to efficiency, provided with a fine film applied to its end face.

A capillary set can also be used for scanning a parallel beam, e.g., for synchrotron radiation. In this case angle $\theta$ of the beam incidence upon the reflecting surfaces of the channel walls should be within the following limits $$0 \leq \theta \leq \theta_c.$$

Monochromatic radiation can be focused with the aid of a Fresnel zone plate. When used as the radiation source is in this case a quasi-point source, e.g., an X-ray tube, so only a very small proportion of the radiation from such a source can be made use of, because an efficient dimension of the source used must in this case be at the micron level. That is why use of said zone plates with conventional quasi-point sources has received no further development and said plates are largely applied for focusing synchrotron radiation which features good parallelism. On account of the fact that a hemilens is capable of transforming a divergent radiation generated by a nonpoint source into a quasi-parallel one, such a hemilens can be positioned past a quasi-point divergent-radiation source, and a Fresnel zone plate can be placed past said hemilens. In a similar geometry a Bragg-Fresnel lens can be used rather than a Fresnel plate, because said lens features better focusing properties than Fresnel zone plate.

A capillary set can efficiently be used as a collimator. Two approaches can be used for the purpose.

A first approach consists in that the inner reflecting surface is "spoilt", i.e., its reflectance is reduced. For instance, in the case of neutrons, boron is added to the material of the reflecting surface, which badly increases absorptivity and decreases reflectance thereof. "To spoil" the reflecting surface by rendering it very rough can be by resorting to diverse methods, chemical ones inclusive.

A second way resides in an increased number of reflections due to a changed L/d ratio (where L denotes length of the capillaries, and d states for their diameter). In this case those particles are first to drop out of the mode which have relatively large angles of reflection. Thus, only the photons that have undergone a low number of reflections and hence feature a low divergence will emerge from the capillaries.

It is noteworthy to cite a number of important applications of such collimators made up of mono- and polycapillaries.

When imaging an object irradiated with a beam of luminous, infrared, X-ray, or other radiation, a badly scattered radiation occurs past the object, which hampers producing a smart contrast image. That is why it is common practice to place a raster past the object to suppress the scattered radiation. This, however, results in a higher exposure dose. The question is especially urgent for X-ray, luminous, and infrared radiations. Thus, when a luminous or infrared radiation is transmitted through some objects, such as biological ones, tissues, or human body, a very strong scattered radiation results. Therefore these types of radiation have so far been used only for imaging thin objects, wherein scattered radiation is not yet so strong.

On the other hand, it is sufficient to place the collimators of the above-mentioned types past a rather thick object for a scattered radiation to be separated from a nonscattered radiation, i.e., a straight-through transmitted one. In addition, one can attain high spatial resolution at the level of $\sim d+\theta L_1$, where d is the channel diameter, $\theta$ is the angle of collimation, and $L_1$ is the thickness of the object. With d on the order of 10 microns, $\theta \sim 10^{-3}$ rad. and $L_1 \sim 10$ cm, one can obtain a resolution at the level of 100 microns, which is quite sufficient in a majority of medical applications. When using luminous, infrared, or other radiations, it is on the concept discussed herein that fundamentally new instruments and apparatus can be developed, such as tomographs, microscopes, mammographs, etc. operating on a luminous, infraded, or other radiation rather than on X-rays, and thus imposing no radiation load on the patient.

Use of capillaries in the capacity of collimators may be of high efficiency, because standard collimators has a very low transparency and very large holes.

It is necessary to call attention to a possibility of existing an important physical effect in the herein-proposed invention, namely, an interference effect that accompanies the use of a monochromatic radiation.

An X-ray lens or hemilens may be so constructed that the transfer channels may feature an axial symmetry in the transverse plane square with the central axis of the device.

Figure 31:
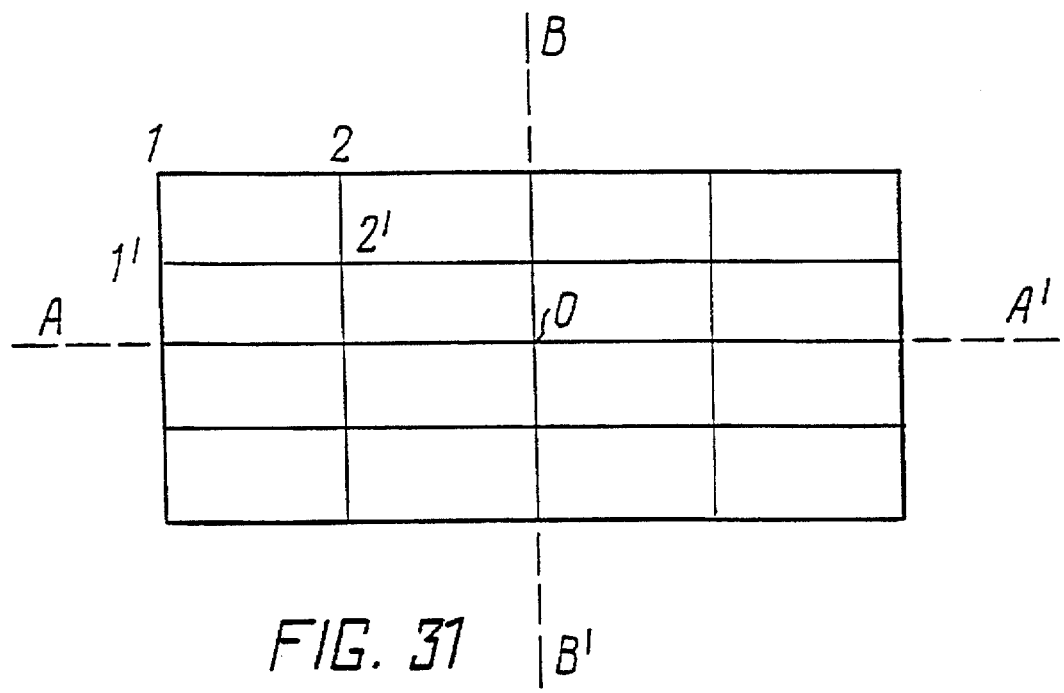
FIGS. 31 and 32 represent schematically a first- and second-order symmetry, respectively.

The aforesaid is illustrated by FIG. 31, wherein a cross-sectional view of a lens is represented, consisting of 16 large rectangular blocks, e.g., monocapillaries. The axis of symmetry of said lens passes through a point o. The monocapillaries are arranged orderly with respect to the axis of symmetry, e.g., a line 1-1' and a line 2-2' are parallel to a line BB', and lines 1-2 and 1'-2' are parallel oto a line AA; lines AA' and BB' being the principal lines. Besides, the ratio between the sides of an individual block 11 22, as well as that of other blocks, are exactly the same in all blocks and in the system as a whole. Such a symmetry of large blocks will hereinafter be referred to as the first-order symmetry.

Figure 32:
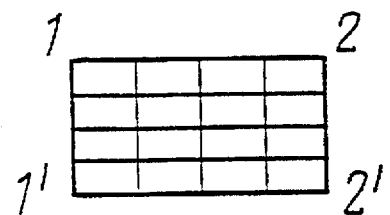

However, there may be a higher-order symmetry. Thus the block may in turn be built up of smaller structures. This is exemplified by the block 11 22 in FIG. 32, wherein smaller channels follow the geometry of the main (large) blocks both as to arrangement and side-to-side ratio. Such a symmetry will hereinafter be termed as the second-order symmetry.

When the smaller channels are constituted by still smaller ones arranged so orderly as the larger structures, such a system features the third-order symmetry.

Apart from the fact that lenses and hemilenses may be ordered in the aforementioned sense, each of the channel layers has a 52 rule its own radius of curvature and hence its own length. (Here and hereinafter by the channel layers are meant, in particular, groups of channels forming closed contours, that is, rectangular lenses having a rectangular cross-section as shown in FIG. 31, or annular in the case of a circular cross-section; a layer can be established also by a single channel having a corresponding configuration as shown, e.g., in FIG. 25. Such layers are coaxial and encompass the lens longitudinal axis being spaced different distances apart therefrom. The layers may also not establish closed contours, e.g., be "flat" in the case of a rectangular lens cross-section and have a width equal to the width of said cross-section. For each of such layers located on one side of the plane of symmetry of the lens which passes through the longitudinal axis thereof, there should exist a similar symmetrically arranged layer on the opposite side of said plane. In a view of the lens cross-section the channels forming such layers are symmetrical with respect to the axis of said cross-section). That is why monochromatic photons undergo unequal number of reflections in different channels so that a system of waves differing in phases virtually arises after said photons have emerged from the lens, considering the process from the standpoint of the wave theory. A phase difference is established due to different pathlengths of photons along the channels. When the channels are arranged randomly no useful effects are obtained because there occurs random mixing of phases. However, in the case of axial symmetry this results in wave interference. Of practical importance is the fact that considerable proportion of energy emerging from the lens (hemilems) is concentrated in the central maximum, and the size itself of said central maximum is found to approximate the size of the radiation transfer channel.

The aforementioned effect takes place in the case of a quasi-point monochromatic radiation when used as an optical device is a simple straight set of mono- or polycapillaries featuring axial symmetry in a transverse plane.

It is also noteworthy that lenses and hemilenses featuring axial symmetry of their transfer channels can be used as spectrometers. With a fixed distance between a polychromatic source and the lens, some radiation wavelength or another is focused past the lens at different distances therefrom, whereas at one fixed distance from said length an interference pattern from different wavelengths is observed.

It is also pertinent to note that to realize the aforementioned possibilities arising due to observance of axial symmetry with orderly arranged radiation transfer channels in the lens cross-section, it is not necessary to apply any coatings to the walls of capillaries or polycapillaries made, e.g., from glass. However, use of capillaries or polycapillaries provided with coatings according to the proposed invention gives a better effect.

In some cases straight mono- or polycapillaries or a set thereof can be used to good advantage for focusing a radiation emergent from a quasi-point source. In this case the angle of radiation capture is equal to $2\theta_c$, and the number of reflections equals unity.

Figure 33:
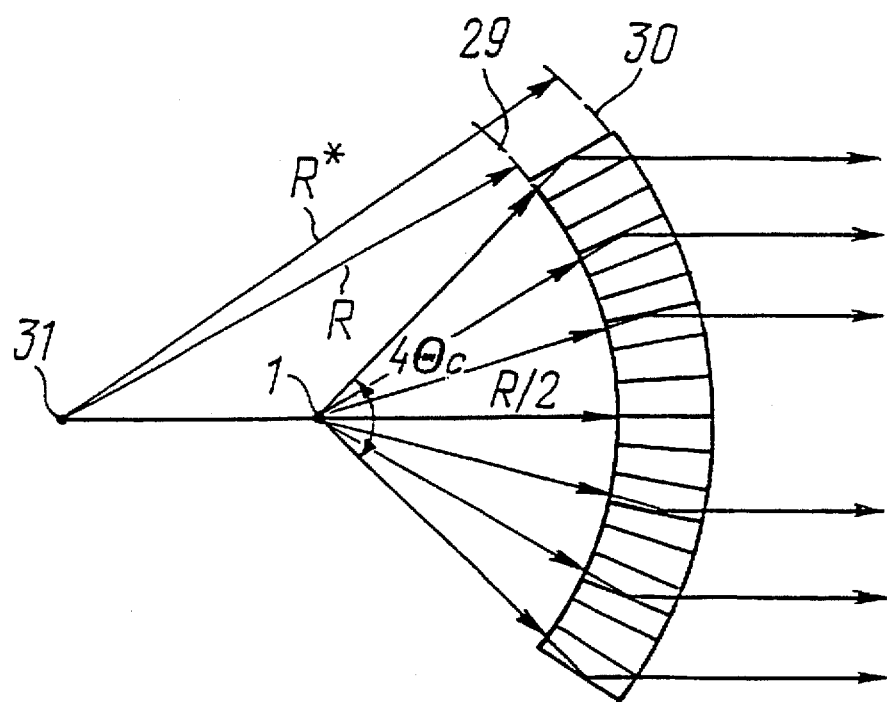
FIG. 33 is a schematic representation of transformation of a divergent beam into a quasi-parallel one as a result of a single reflection.

In some instances use can be made of a system of mono-or polycapillaries (FIG. 33) oriented to the radiation source; in this case the ends of the capillaries lie in two spherical surfaces 29, 30 having the radii of R and R* respectively and a common center 31. The radiation source 1 is arranged on the axis of the optical system a distance of R/2 from the inner spherical surface, while the dimensions of the optical system and the capillary lengths are so selected that the capture angle equals $4\theta_c$, and the radiation undergoes a single reflection only. The same system can be applied for focusing a quasi-parallel beam.

Capillary lenses and hemilenses can be so provided that they would function in many respects as Fresnel zone plates. To this end, it is necessary that all the layers be approximately equal in area, which can be attained by two ways.

The first way is as follows. With a preset energy $E=E_1$ radiation capture is determined by the factor $\gamma=r\theta_c^2/2d$; if $r<r_{c=2d/\theta_c^2}$, then $\gamma<1$, that is degree of occupation of the capillary with the radiation is below unity.

The area of the nth layer of capillaries spaced a distance $r_n$ apart from the center is obviously equal to $S_n=2\pi r_n \cdot \Delta r_n$, where $\Delta r_n$ is the capillary diameter on the nth layer (or the width of the nth layer). But $\Delta r_n \sim \gamma \sim r_n$. Now if one selects $r_n \sim 1/n$ (that is, the radii of curvature of the capillaries decrease in the direction away from the center), it is quite evident that $S_n \sim 1/n$; but as $r_n \sim n$, so $S_n$ is independent of n, that is, all layers are equal in area, but the width of layers decreases from the center towards the periphery. Such a geometry is completely similar to that of a Fresnel zone plate.

The other way to attain said object consists in that from the very beginning each layer of the capillaries has its own diameter so as to satisfy the condition of constant areas of all the layers.

In both cases described above the lens functions similarly to a Fresnel zone plate.

When producing capillary lenses and hemilenses the capillaries can be so drawn as to make them twisted, and the paths of photons resemble a helical line. It is possible that part of the capillaries "twist" in one sense, and the other, in the opposite sense. This enables one to obtain a number of interesting possibilities. First, if a beam of unpolarized photons (or neutrons, or charged particles) is applied to the lens entrance, said beam can be subdivided, due to the twist effect, into a number of plane-polarized beams. Secondly, when a plane-polarized beam is provided originally, the plane of polarization of said beam rotates in a twisted capillary.

Industrial Applicability

The inventions proposed herein can find application in analytic instrument-making, more specifically in elementary analysis, three-dimensional local analysis, defectoscopy, astronomy for developing a new-type X-ray telescope, for developing position-sensitive detectors and tomographs featuring micron and submicron resolution, in microscopy for developing high-efficiency and intensity microscopes for use, in particular, in microscopy of biological objects, in microelectronics for contact and projection lithography, in X-ray and neutron diffractometry for establishing new-type collimators, as well as new-type diffraction and interference instruments, in particular, for enhancing radiation density.

I claim:

1. A method for controlling beams of neutral and charged particles, comprising the step of directing the beams to different-density alternating media to cause multiple diffuse and scattering of the particles during their interaction with the different-density alternating media, said alternating media providing a three-dimensional multilayer structure having periods varying both along a longitudinal axis on a surface of the structure and along cross-section of the structure in a direction perpendicular to said longitudinal axis.

2. A method according to claim 1, wherein the particles interact with said alternating media that have interfaces in different phase states with respect to their substrate.

3. A method according to any one of claims 1 or 2, wherein the particles interact with said alternating media having an inhomogeneous structure in a section transverse with respect to the direction of radiation transfer, the elements of said structure differing in physical properties.

4. A method according to claim 3, wherein inhomogeneous-structure elements of said alternating media with which the particles interact, are arranged unorderly in a section transverse with respect to the direction of radiation transfer.

5. A method according to claim 3, wherein inhomogeneous-structure elements of said alternating media with which the particles interact, are arranged orderly in a section transverse with respect to the direction of radiation transfer with observance of axial symmetry.

6. A device for controlling beams of neutral and charged particles, comprising: a source of neutral and charged particles; and an optical system in the form of alternating different-density media that establish radiation transfer channels to cause multiple scattering of the particles interacted with the media, wherein said alternating media provide a three-dimensional multilayer structure having periods varying both along a longitudinal axis on a surface of the structure and along cross-section of the structure in a direction perpendicular to said longitudinal axis.

7. A device according to claim 6, wherein the surfaces of said alternating media (2, 3) are in different phase states with their substrate.

8. A device according to claim 6, wherein an intervening medium (12) is interposed between at least two said adjacent media, said medium differing from the adjacent media in electromagnetic properties.

9. A device according to claim 6, wherein an intervening medium (11) is interposed between two said adjacent media, said intervening medium being in a phase state other than that of the adjacent media.

10. A device according to claim 6, wherein said alternating media are homogeneous in a section transverse with respect to the direction of radiation transfer.

11. A device according to claim 6, wherein said alternating media have an inhomogeneous structure in a section transverse with respect to the direction of radiation transfer, and the elements of said structure differing in physical properties, are arranged unorderly in said section.

12. A device according to claim 11, wherein the alternating media are essentially hollow glass capillaries.

13. A device according to claim 12, wherein the glass capillaries are put in layers curved in a longitudinal section, the radius of curvature being inversely proportional to the number of the layer counted from the longitudinal axis of the optical system, and is not in excess of $2d/\theta_c^2$, where d is the capillary diameter and $\theta_c$ is the critical angle of reflection.

14. A device according to claim 13, CHARACTERIZED in that the capillaries are twisted.

15. A device according to claim 12, wherein the capillaries have butt ends located on two concentric spherical surfaces (29, 30) and are so made as to capture the radiation in the range of a quadruple critical angle of reflection and a single reflection of the radiation from the inner walls of said capillaries, with the radiation source (1) situated on the longitudinal axis of the optical system and spaced apart from the inner spherical surface a distance equal to half its radius.

16. A device according to claim 6, wherein said alternating media have an inhomogeneous structure in a section transverse with respect to the direction of radiation transfer, and the elements of said structure differing in physical properties, are arranged orderly in said section with observance of axial symmetry.

17. A device according to claim 16, wherein the alternating media are in fact glass capillary bars.

18. A device according to claim 6, wherein he optical system may be made as a single or a number of separate sections (13, 14, 15) tandem-arranged in the direction of radiation transfer.

19. A device according to claim 18, wherein the sections of the optical system appear as different-shape lenses or hemilenses (21).

20. A device according to claim 19, wherein the lenses or hemilenses appear as similarly oriented planar structures (26).

21. A device according to claim 19, wherein the optical system has two sections tandem-arranged in the direction of radiation transfer, the lenses or hemilenses of the first and second sections being formed by planar structures oriented mutually orthogonality.

22. A device according to claim 19, wherein the optical system comprises additionally a section arranged in the direction of radiation transfer and appearing as a set of structures parallel to one another, said section making up an angle with the direction of radiation emerging from the preceding section.

23. A device according to claim 22, wherein provision is therein made for changing the setting angle of a section appearing as a set of structures parallel to one another.

24. A device according to claim 19, wherein each of the lenses or hemilenses appears as a set of miniature lenses or hemilenses (28) in such a manner that its cross-section is established by the sum of cross-sections of the miniature lenses or hemilenses and of the gaps therebetween.

25. A device according to claim 24, wherein the miniature lenses (28) are asymmetrical.

26. A device according to claim 24, wherein the miniature lenses or hemilenses (28) that make part of the set differ in focal length and radiation capture angle.

27. A device according to claim 26, wherein the miniature lenses or hemilenses (28) located near the longitudinal axis and the periphery of the lens they constitute differ in focal length and radiation capture angle.

28. A device according to claim 24, wherein the miniature lenses or hemilenses (28) have their cross-sectional dimensions variable in the direction from the longitudinal axis of the optical system towards the periphery thereof.

29. A device according to claim 24, wherein the miniature lenses or hemilenses (28) are curved in the plane passing through the longitudinal axis of the lens or hemilens they constitute; the radius of curvature of said lenses or hemilenses being variable steadily as soon as the spacing between the miniature lenses or hemilenses and said axis increases.

30. A device according to claim 24, wherein the miniature lenses or hemilenses (28) have the same radius of curvature in the plane passing through the longitudinal axis of the lens or hemilens they constitute and differ in length or cross-section.

31. A device according to claim 18, wherein the optical system of the device consists of two sections of which the first one appears as a lens or hemilens, and the second one, as a Fresnel zone plate or a Fresnel-Bragg zone plate.

32. A device according to claim 19, wherein it comprises a section appearing as a set of miniature hemilenses bent to the same side in the plane passing through the longitudinal axis of the hemilens they constitute.

33. A device according to claim 19, wherein it comprises a section appearing as a set of miniature hemilenses bent in the same way in the plane passing through the longitudinal axis of the hemilens they constitute and having the variable direction of bend.

34. A device according to claim 6, wherein a conductive or a superconductive layer is applied to the surface of the radiation transfer channels formed by said alternating media.

35. A device according to claim 6, wherein the end face (25) of the optical system on the side of radiation entrance is concave with a possibility for the radiation source to be spaced apart equidistantly from all points of the optical system.

36. A device according to claim 6, wherein the end face (25) of the optical system on the side of radiation entrance is convex.

37. A device according to claim 6, wherein the optical system is fashioned as a symmetric or asymmetric lens.

38. A device according to claim 6, wherein the optical system is made with a possibility of placing the radiation source thereinside.

39. A device according to claim 6, wherein the radiation transfer channels diverge in the direction of radiation transfer.

40. A device according to claim 39, wherein the radiation transfer channels are curved in the plane passing through the longitudinal axis of the optical system, the radius of curvature of the external channels being equal to $$R=(H-h)/\phi^2,$$

where

H, h—cross-sectional dimensions of the optical system at its entrance and exit, respectively;
$\phi$—required radiation capture angle.

41. A device according to claim 6, wherein the radiation transfer channels have constant cross-section along the length thereof, wherein $$l=d\phi^2/\theta_c,$$

where l, d—length and diameter of the channel, respectively;
$\theta_c$—critical angle of reflection;
$\phi$—required radiation capture angle.

42. A device according to claim 6, wherein the walls of the radiation transfer channels in the entrance and exit portions of the optical system make up an obtuse angle therebetween.

43. A device according to claim 6, wherein the radiation transfer channels in the entrance portion of the optical system have a constant cross-section along the length thereof, and those in the exit portion of the optical system are divergent or convergent and are bent to one side with respect to the entrance portion thereof.

44. A device according to claim 6, wherein the walls of the radiation transfer channels have unclosed surfaces.

45. A device according to claim 6, wherein the walls of the radiation transfer channels have closed coaxial surfaces.

46. A device according to claim 6, wherein the optical system appears as a bundle of capillaries or polycapillaries having their cross-sections variable along the length thereof.

47. A device according to claim 46, wherein that the capillaries have a conical surface with the parameters satisfying the following relation $$(\delta\theta_1+\phi_c)\cdot D_1=(\delta_2+\phi_c)\cdot D_2,$$

where $\delta\theta_1$—initial divergence of the quasi-parallel beam;
$\delta\theta_2$—required angle of beam divergence at the exit;
$\phi_c$—cone angle;
$D_1$, $D_2$—entrance and exit diameters, respectively.

48. A device according to claim 6, wherein the walls of the radiation transfer channels are coated with a layer capable of absorbing soft X-ray radiation.

49. A device according to claim 6, wherein the radiation transfer channels have micron and submicron cross-sectional dimensions and are assembled without use of external support structures.

50. A device according to claim 6, wherein said alternating media provide multilayer diffraction structures.

51. A device according to claim 50, wherein the optical system has a section provided with channels formed by plane surfaces, and the multilayer structures applied to the interfaces have a period varying from the periphery towards the longitudinal axis of the optical system.

52. A device according to claim 50, wherein the multilayer diffraction structures applied to all interfaces have the same period, and the optical system has one section with the transfer channels established by plane surfaces and having their length either increasing from the periphery towards the longitudinal axis of the optical system (with the same spacing between all adjacent planes), or remaining the same with said interplane spacing decreasing from the periphery towards the longitudinal axis of the optical system.

53. A device according to claim 52, wherein the optical system comprises additionally a second section positioned past the first one as along the radiation transfer, wherein the radiation transfer channels are formed by the planes orthogonal to the planes of the first section, the second section differing from the first one in focal length.

54. A device according to claim 53, wherein the optical system is provided with a third and a fourth section tandem-arranged past the second one in the direction of radiation transfer and similar to the second and first sections, respectively but oriented oppositely with respect to the direction of radiation transfer.

55. A device according to claim 50, wherein the optical system appears as paraboloids fitted into one another and having their inner surfaces provided with multilayer diffraction structures having a variable period.

56. A device according to claim 50, wherein the multilayer diffraction structures of the optical system appear as a set of square or rectangular channels.

57. A device according to claim 50, wherein the multilayer diffraction structures is used in an optical system appearing as a set of capillaries assembled into a square or a rectangle, in the form of a coating applied to the inner surfaces of said capillaries and having alternating periods equal in number with the required monochromatic radiation lines at the exit of the device.

58. A device according to claim 50, wherein the multilayer coating has an amorphous or a crystalline structure, or a combination of both.

59. A device according to claim 58, wherein the multilayer coating is made use of in an optical system comprising a set of capillaries or polycapillaries whose diameter are not in excess of $$d_c = C/\omega_p$$

for X-rays, or $$d_c = 1/(N\bar{b})^{1/2}$$

for neutrons, where

C—velocity of light;

$\omega_p$—plasma frequency of the material coating the inner surface of the channel;

N—concentration of the nuclei;

$\bar{b}$—nuclear amplitude.

60. A device according to claim 6, wherein when use is therein made of said adjacent alternating media differing in electromagnetic properties, the radiation transfer channels have a period satisfying the following relations $$d_n < 2f\theta_c + l_c$$

or $$d_n > 2f\theta_c + l_c$$

where $l_c$—period of the radiation transfer channel;

$d_n$—diameter of the radiation source;

f—distance from the radiation source to the optical system;

$d_n$—diameter of the radiation source;

$\theta_c$—critical angle of reflection.

61. A device according to claim 6, wherein the optical system appears as a set of capillaries or polycapillaries having their inner surfaces coated with a highly absorptive, a rough, or other layer capable of reducing the reflectance of a radiation (luminous, infrared, ultraviolet, X-ray, neutron, electron, positron, or ion), or the ratio between the length of the channel of the capillaries or polycapillaries and the diameter of the transfer channel is so large that only the radiation that is incident on the transfer channels at a very small angle to the channel axis may pass through the capillaries or polycapillaries.

62. A device according to claim 6, wherein the optical system appears as a set of capillaries or polycapillaries and is provided with a fine film applied to the exit end thereof.

63. A device according to claim 6, wherein the optical system is built up of capillaries or polycapillaries assembled into blocks differing in the diameters of the capillaries or polycapillaries said blocks are made from.

64. A method for controlling beams of neutral and charged particles, comprising the step of directing the beams to different-density alternating media to cause multiple diffuse and scattering of the particles during their interaction with the different-density alternating media, wherein said alternating media provide a three-dimensional multilayer structure having density varying both along a longitudinal axis on a surface of the structure and along cross-section of the structure in a direction perpendicular to said longitudinal axis.

65. A device for controlling beams of neutral and charged particles, comprising: a source of neutral and charged particles; and an optical system in the form of alternating different-density media that establish radiation transfer channels to cause multiple scattering of the particles interacted with the media, wherein said alternating media provide a three-dimensional multilayer structure having density varying both along a longitudinal axis on a surface of the structure and along cross-section of the structure in a direction perpendicular to said longitudinal axis.

* * * * *